US010936862B2

(12) United States Patent
Such et al.

(10) Patent No.: US 10,936,862 B2
(45) Date of Patent: Mar. 2, 2021

(54) SYSTEM AND METHOD OF CHARACTER RECOGNITION USING FULLY CONVOLUTIONAL NEURAL NETWORKS

(71) Applicant: Kodak Alaris Inc., Rochester, NY (US)

(72) Inventors: Felipe Petroski Such, Rochester, NY (US); Raymond Ptucha, Honeoye Falls, NY (US); Frank Brockler, Rochester, NY (US); Paul Hutkowski, Pittsford, NY (US); Vatsala Singh, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 65 days.

(21) Appl. No.: 15/709,014

(22) Filed: Sep. 19, 2017

(65) Prior Publication Data

US 2018/0137349 A1    May 17, 2018

Related U.S. Application Data

(60) Provisional application No. 62/422,000, filed on Nov. 14, 2016, provisional application No. 62/524,983, filed on Jun. 26, 2017.

(51) Int. Cl.
*G06K 9/00* (2006.01)
*G06N 3/04* (2006.01)
(Continued)

(52) U.S. Cl.
CPC ..... *G06K 9/00409* (2013.01); *G06K 9/00422* (2013.01); *G06K 9/00463* (2013.01);
(Continued)

(58) Field of Classification Search
None
See application file for complete search history.

(56) References Cited

FOREIGN PATENT DOCUMENTS

EP    0622752 A2    2/1994

OTHER PUBLICATIONS

Shlapbach, Writer Identification Using an HMM-Based Handwriting Recognition System: to Normalize the Input or Not?, Pattern Analysis and Applications 2007 (Year: 2007).*

(Continued)

*Primary Examiner* — Mark Roz
(74) *Attorney, Agent, or Firm* — Hogan Lovells US LLP

(57) ABSTRACT

Embodiments of the present disclosure include a method for extracting symbols from a digitized object. The method includes processing the word block against a dictionary. The method includes comparing the word block against a word in the dictionary, the comparison providing a confidence factor. The method includes outputting a prediction equal to the word when the confidence factor is greater than a predetermined threshold. The method includes evaluating properties of the word block when the confidence factor is less than the predetermined threshold. The method includes predicting a value of the word block based on the properties of the word block. The method further includes determining an error rate for the predicted value of the word block. The method includes outputting a value for the word block, the output equal to a calculated value corresponding to a value of the word block having the lowest error rate.

9 Claims, 30 Drawing Sheets

(51) Int. Cl.
　　　*G06K 9/72*　　　(2006.01)
　　　*G06K 9/62*　　　(2006.01)
　　　*G06N 3/08*　　　(2006.01)
(52) U.S. Cl.
　　　CPC ......... *G06K 9/6255* (2013.01); *G06K 9/6273* (2013.01); *G06K 9/72* (2013.01); *G06N 3/0445* (2013.01); *G06N 3/0454* (2013.01); *G06N 3/0472* (2013.01); *G06N 3/08* (2013.01); *G06K 2209/01* (2013.01)

(56) References Cited

OTHER PUBLICATIONS

International Search Report and Written Opinion issued in PCT/US/2017/061556 dated Feb. 23, 2018.
International Search Report and Written Opinion issued in PCT/US/2017/061562 dated Feb. 23, 2018.
Bunke et al., "Handbook of character recognition and document image analysis, Chapter 1," Feb. 1, 1997, World Scientific Publishing, Singapore, pp. 1-47.
Bunke et al., "Handbook of character recognition and document image analysis, Chapter 7," Feb. 1, 1997, World Scientific Publishing, Singapore, pp. 183-225.
Dengel et al., "Techniques for Improving OCR Results," Handbook of character recognition and document image analysis, Jan. 1, 1997, World Scientific, Singapore, pp. 227-258.
Dhaka et al., "Character Recognition of Offline Handwritten English Scripts: A Review," Neural Computing and Applications, Jul. 1, 2014, pp. 94-103.
Graves et al., "Offline Handwritten Recognition with Multidimensional Recurrent Neural Networks," Advances in Neural Information Processing Systems 21: 22nd Annual Conference on Neural Information Processing Systems 2008, vol. 1, Jun. 1, 2009, pp. 1-8.
Jain et al., "Probablilistic Approach for Correctionof Optically-Character-Recognized Strings Using Suffice Tree," 2011 Third National Conference on Computer Vision, Pattern Recognition, Image Processing and Graphics, Dec. 15, 2011, pp. 74-77.
Schenkel et al., "On-line cursive script recognition using time-delay neural networks and hidden Markov models," Machine Vision Applications (1995), 8:215-223.

\* cited by examiner

| COMPARISON WORD \ PREDICTED WORD | | t | y | m | m | e |
|---|---|---|---|---|---|---|
| | | 0 | 1 | 2 | 3 | 4 |
| t | 1 | 0 | . | . | . | . |
| - | 2 | . | . | . | . | . |
| m | 3 | . | . | . | . | . |
| e | 4 | . | . | . | . | . |

FIG. 13B

| PREDICTED WORD | | t | y | m | m | e |
|---|---|---|---|---|---|---|
| | 0 | 1 | 2 | 3 | 4 | 5 |
| t | 1 | 0 | . | . | . | . |
| - | 2 | 1 | . | . | . | . |
| m | 3 | 2 | . | . | . | . |
| e | 4 | 3 | . | . | . | . |

FIG. 13C

| COMPARISON WORD \ PREDICTED WORD | | t | y | m | m | e |
|---|---|---|---|---|---|---|
| | 0 | 1 | 2 | 3 | 4 | 5 |
| t | 1 | 0 | 1 | 2 | 3 | 4 |
| - | 2 | 1 | 1 | 2 | . | . |
| m | 3 | 2 | 2 | 1 | 2 | . |
| e | 4 | 3 | 3 | 2 | 2 | . |

FIG. 13D

| PREDICTED WORD | | t | y | m | m | e |
|---|---|---|---|---|---|---|
| | 0 | 1 | 2 | 3 | 4 | 5 |
| t | 1 | 0 | 1 | 2 | 3 | 4 |
| - | 2 | 1 | 1 | 2 | 3 | 4 |
| m | 3 | 2 | 2 | 1 | 2 | 3 |
| e | 4 | 3 | 3 | 2 | 2 | 2 |

0066284107        wearing        conversing 80731829029027615    5453    accommodated

259910047        FLEECE        KNOCK

FIG.17

| INPUT | LABEL | PREDICTION |
|---|---|---|
| | 5Ye-es | SYe-es |
| | President's | Preseciten's |
| | Liverpool | liverpool |
| | up | eys |
| | only | outle |
| | ' | , |
| | the | the |
| | Ifor | Ifor |
| | that | that |
| | weapons | weapons |

FIG.18

| INPUT | LABEL | PREDICTION |
|---|---|---|
| | permet | puent |
| | vous | vur |
| | XEXGR52 | XEXGGRS2 |
| | commandées | commandores |
| | ces | Cs |
| | effet | effett |
| | département | tiprtement |
| | salutations | salutations |
| | l'expression | l'expression |
| | effectuer | effectuer |

FIG.19

SYSTEM AND METHOD OF CHARACTER RECOGNITION USING FULLY CONVOLUTIONAL NEURAL NETWORKS

CROSS REFERENCE TO RELATED APPLICATIONS

This application claims priority to and the benefit of U.S. Provisional Application Ser. No. 62/422,000 filed Nov. 14, 2016, titled "SYSTEM AND METHOD OF CHARACTER RECOGNITION USING FULLY CONVOLUTIONAL NEURAL NETWORKS" and U.S. Provisional Application Ser. No. 62/524,983 filed Jun. 26, 2017, titled "SYSTEM AND METHOD OF CHARACTER RECOGNITION USING FULLY CONVOLUTIONAL NEURAL NETWORKS WITH ATTENTION," the full disclosures of which are hereby incorporated herein by reference in their entireties for all purposes.

BACKGROUND

1. Field of the Invention

The present disclosure relates to digital character recognition. More particularly, the present disclosure relates to systems and methods for digital character recognition of handwritten text or digitized text.

2. Description of Related Art

Intelligent Character Recognition (ICR) is the task of deciphering digitized handwritten text. In certain systems, lines and sections of the handwritten text are extracted based on white space positioned between blocks of text. From there, dictionary based recognition systems may be utilized to determine the context of the blocks of text. However, handwritten text has virtually infinite different styles because no two handwritten symbols are identical, and based on the writing styles of the person that transcribed the text, and therefore traditional methods typically associated with Optical Character Recognition (OCR) may not produce satisfactory results. Accordingly, various neural networks (e.g., convolutional, recurrent, and the like) may be utilized with a variety of techniques to improve the recognition of handwritten text. These methods may be processing intensive, or produce insufficient results due to the reliance on techniques utilized in OCR. It is now understood that improved methods of digital character recognition of handwritten text are desired.

Convolutional Neural Networks (CNNs) have revolutionized the computer vision and pattern recognition community, and specifically offline handwriting recognition Jaderberg et al. used CNNs on OCR tasks in natural images. Poznanski and Wolf used deep CNNs to extract n-grams which feed Canonical Correlation Analysis (CCA) for final word recognition. Although this approach performs well in applications with fixed vocabulary, increasing the size of the vocabulary significantly impacts performance. More importantly, applications with phone numbers, surnames, street addresses, etc. could have unbounded dictionaries. Recurrent Neural Networks (RNNs), such as Long Short Term Memory (LSTM) units, split an image into segments and read it as a sequence of inputs. Connectionist Temporal Classification (CTC) further eliminates the need for precise alignment. Xie et al. used CNNs to feed a multi-layer LSTM network for handwritten Chinese character recognition. Similar techniques have also been used for text recognition in natural imagery.

Sun et al. used deep convolution layers followed by multidimensional RNNs. Voigtlaender et al. used alternating layers of convolution followed by multidimensional RNNs. Voigtlaender et al. performed ICR at the paragraph level to include language context. Recent Fully Convolutional Neural Network (FCN) methods take in arbitrary size images and output region level classification for simultaneous detection and classification. Handwritten word blocks have arbitrary length and can benefit from FCN methods. By using an initial CNN to calculate the number of symbols in a word block, word blocks can be resized to a canonical height tuned to a FCN architecture. Knowing the average symbol width, this FCN can then perform accurate symbol prediction without CTC post processing.

Offline handwriting recognition is more challenging problem than online handwriting recognition. In online handwriting recognition, features can be obtained from both pen trajectories and image, whereas in offline handwriting recognition, features can only be obtained using a still image. In both the cases, input features have traditionally been extracted from data, then a classifier like Artificial Neural Network (ANN) or Gaussian Mixture Model (GMM), were used to estimate posterior probabilities. These posterior probabilities were given as an input to a Hidden Markov Model (HMM) to generate transcriptions. One of the major disadvantages of HMMs is that they fail to model long term dependencies in input data. However, Recurrent Neural Networks (RNNs) such as Long Short Term Memory (LSTM) units can help to resolve this drawback. LSTMs can model long dependencies and have shown improvement in sequence learning tasks like speech recognition, machine translation, video summarization, and more.

One of the advantages of using deep neural networks is that inputs can be unprocessed data such as raw pixels of an image, rather than extracting specific features in previous methods. Input to RNNs is usually 1D. For example, in online handwriting recognition, it is pen stoke grid values. But in offline recognition, the input is a 2D image. A naive way would be taking every column of an image as a 1D vector and feeding it as an input to a RNN. However, this cannot handle distortions along the vertical axis. The same image will look different if a pixel is shifted down by one pixel. Another way to tackle this problem is to use multi-dimensional RNNs, which take contextual information from several the directions, e.g. left, right, top, and bottom. The idea is to use both spatial and temporal information. The use of Connectionist Temporal Classification (CTC) enables the use of inputs without any prior segmentation as opposed to forcefully aligning inputs in previous approaches. One of the major advantages of the CTC algorithm is that you do not need properly segmented labeled data. The CTC algorithm takes care of the alignment of input with the output.

Recognizing handwritten characters in traditional approaches involves extracting features for classification, extracting features for segmentation, and parsing to map spatial relationships among characters for recognition. Segmenting of text into lines, words, and characters require sophisticated approaches. Segmenting unconstrained handwritten words or characters is much more difficult than typed text because text can undulate up and down. Huang and Srihari described an approach to separate a line of unconstrained text to words. They proposed a gap metrics based approach to perform word segmentation task. They extracted local features like distance between current pair of components, distance between previous and next pair of components, width and height of left and right components, along with global components like average height, width of grouped components and average distance between components.

Rather than segmenting words some methods segment characters. Gader et al. proposed character segmentation utilizing information as you move from background pixels to foreground pixels in horizontal and vertical directions of the character image. Transition is performed based on traversals in left to right, right to left, top to bottom, and bottom to top direction. Whenever a transition is encountered from background to foreground, the ratio between location of the pixel and distance across the image in that direction is calculated. Liu and Blumenstein proposed character recognition using a combination of transition and direction features, which they called Modified Direction Feature. For each transition, a pair of location of transition and direction of transition is used for segmentation. Crossing features are used in character recognition, where the idea is to find the number of times a line intersects a trace of the character. If the line intersects at multiple places then the first and last intersection can be used to describe shape of the symbol.

Doetsch et al. proposed hybrid RNN-HMM for English offline handwriting recognition. In order to get framewise labeling they applied HMM to the training data. These frames were then used as an input to an RNN, with corresponding target labels. The system was trained to get posterior probabilities which generated emission probabilities for an HMM, which were used to generate transcription for a given input. They introduced a new technique of scaling gates of a LSTM memory cell by using a scalar multiple for every gate in each layer of the RNN. The scaling technique for LSTM gates reduced Character Error Rate (CER) by 0.3%. Bluche et al. compared Convolutional Neural Network (CNN) and traditional feature extraction techniques along with HMM for transcription.

CNNs work on a sliding window technique, where a filter of fixed width is scanned across an image to extract features from it. CNNs predict the posterior probabilities for each filter. One of the difficulties using this approach is assigning labels to input sliding windows. GMM-HMM trained on handcrafted features are used to assign a label to the sliding window portion. Thus, the system can be trained end to end and the posterior probabilities can be used to estimate emission probabilities for the HMM, which outputs the final labeling sequence. This technique outperforms traditional feature extraction methods for offline handwriting recognition.

Pham et al. proposed Multidimensional RNN using dropout to improve offline handwriting recognition performance. RNNs with dropout prevent over fitting on the training set, similar to regularization. Using dropout improved accuracy by 3%. Deep CNNs for offline handwriting recognition have also been used for languages other than English. Dewan and Srinivasa used DNNs for offline character recognition of Telugu characters. They used auto encoders, where the model was trained in a greedy layer wise fashion to learn weights in an unsupervised fashion, then fine-tuned by training the network with supervised data.

SUMMARY

Applicants recognized the problems noted above herein and conceived and developed embodiments of system and method, according to the present disclosure, for identification of handwritten text.

In an embodiment a method for extracting symbols from a digitized object includes analyzing digitized objects and determining line whitespace separators to form digitized line blocks. The method also includes transforming digitized line blocks into a one or more word blocks separated by whitespace. The method further includes recognizing symbols in each word block. Additionally, recognition of symbols in each word block includes transforming each word block to a canonical representation of fixed height. Recognition of the symbols in each word block also includes passing each stream of symbols and blanks into a first dictionary checker to assign most common words. If stream of symbols and blanks is amongst most common words, the method is complete, otherwise the method continues. The method also includes passing each word block through a fully convolutional neural network trained to determine symbols and blanks. The method also includes passing symbols and blanks through a symbol based probabilistic correction. Additionally, the method includes outputting determined symbols in the one or more word blocks from first dictionary checker, outputting from a symbol specific translator, or a combination thereof.

In an embodiment a system includes at least one processor; and memory. The memory includes instructions that, when executed by the at least one processor, cause the system to receive a digitized object, the digitized object corresponding to an image including at least one symbol. The system also forms digitized line blocks from the digitized object by determining whitespace separators in the digitized object. Additionally, the system converts the line blocks into one or more word blocks separated by whitespace, the one or more word blocks having a value associated with the at least one symbol forming the one or more word blocks. Furthermore, the system resizes each word block of the one or more word blocks into a canonical representation of a fixed height. The system also evaluates each word block of the one or more word blocks with a dictionary, the dictionary containing a collection of common words. Additionally, the system outputs a first word prediction when one or more of the word blocks corresponds to a word in the collection. The system further determines a number of symbols and a number of blanks in each word block of the one or more word blocks when the one or more word blocks do not correspond to the collection. Additionally, the system evaluates the symbols in the one or more word blocks, the evaluation identifying a value associated with the symbols in the one or more word blocks. The system also performs probabilistic correction on the one or more word blocks. Furthermore, the system outputs a second word prediction, the second word prediction corresponding to the value of the word block.

In a further embodiment a computer-implemented method includes obtaining a word block input, the word block input including at least one symbol. The method includes processing the word block against a dictionary, the dictionary containing a collection of most common words. The method includes comparing the word block against a word in the dictionary, the comparison providing a confidence factor that the word block corresponds to the word. The method also includes outputting a prediction equal to the word when the confidence factor is greater than a predetermined threshold. The method includes evaluating properties of the word block when the confidence factor is less than the predetermined threshold, the properties being at least one of a length of the word block and a number of symbols in the word block. The method also includes predicting a value of the word block based on the properties of the word block. The method further includes determining an error rate for the predicted value of the word block, the error rate corresponding to a calculated difference between the predicated word and one or more words from the dictionary. The method also includes outputting a value for the word block, the output equal to a calculated value corresponding to a value of the word block having the lowest error rate when the confidence factor is less than the predetermined threshold.

In an embodiment a non-transitory computer-readable storage medium storing instructions that, when executed by at least one processor of a computing device, cause the computing device to receive a digital image corresponding to a word block, the word block containing at least one symbol corresponding to a letter, number, character, or a combination thereof. The computing device also evaluates the word block against a dictionary database comprising a list of common words, the evaluation comparing a first predicted word against a dictionary word and outputting the dictionary word when the first predicted word corresponds to the dictionary word. The computing device further determines a number of symbols in the word block and a value of the symbols in the world block when the first predicted word does not correspond to the dictionary word, the determined symbol values being combined to form a second predicted word. Additionally, the computing device performs probabilistic correction on the second predicted word by evaluating at least a portion of the second predicted word against at least a portion of a comparison word to determine a probability that the portion of the second predicted word is more likely than the portion of the comparison word. The computing device further outputs a third predicted word based on the probabilistic correction, the third predicted word corresponding to a value of the word block.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

FIG. 13A is a pictorial representation of an embodiment of a statistical character error rate analysis, in accordance with embodiments of the present disclosure;

FIG. 13B is a pictorial representation of an embodiment of a statistical character error rate analysis, in accordance with embodiments of the present disclosure;

FIG. 13C is a pictorial representation of an embodiment of a statistical character error rate analysis, in accordance with embodiments of the present disclosure;

FIG. 13D is a pictorial representation of an embodiment of a statistical character error rate analysis, in accordance with embodiments of the present disclosure;

FIG. 17 is a pictorial representation of sample words generated from a NIST derived dataset, in accordance with embodiments of the present disclosure;

FIG. 18 is a pictorial representation of predictions obtained with the symbol sequence prediction model on the IAM dataset, in accordance with embodiments of the present disclosure; and FIG. 19 is a pictorial representation of examples of predictions obtained on the RIMES dataset using symbol sequence prediction, in accordance with embodiments of the present disclosure.

DETAILED DESCRIPTION

Figure 1:
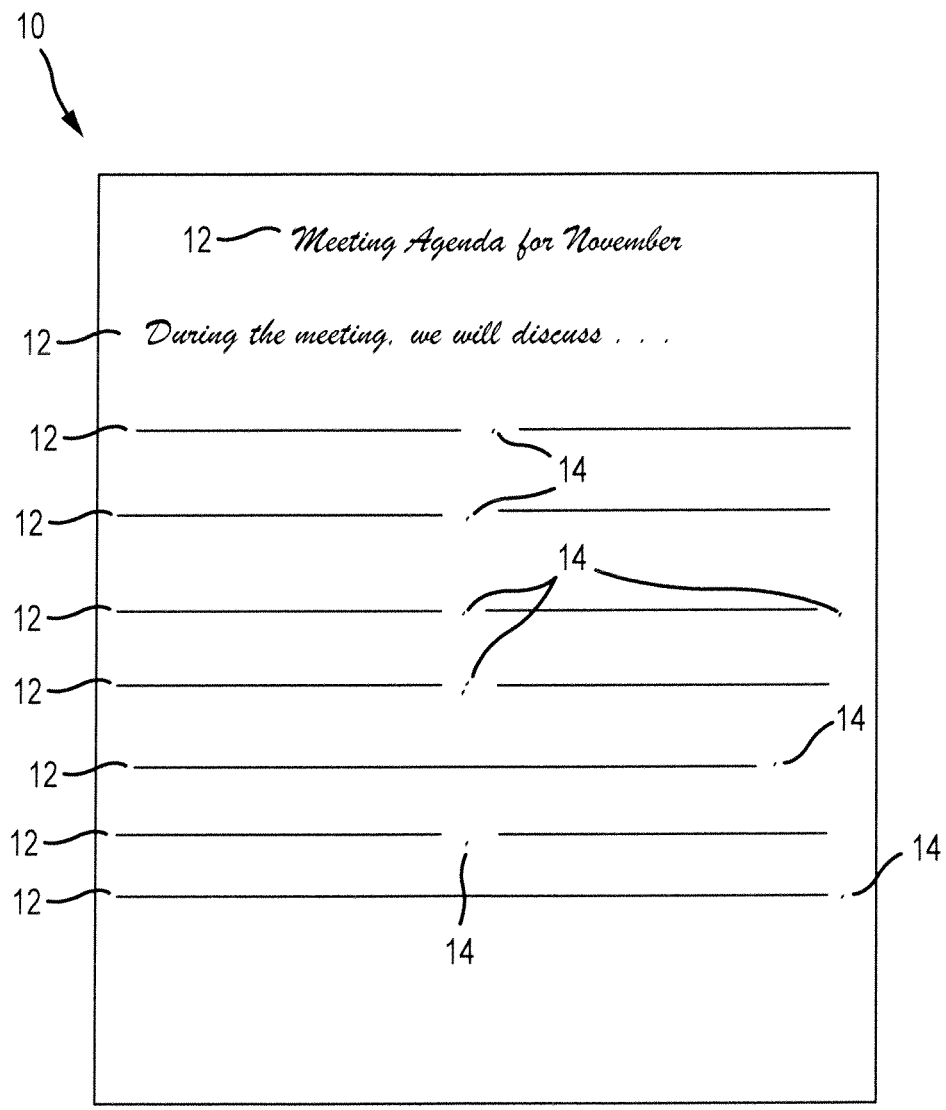
FIG. 1 is a schematic diagram of an embodiment of a handwritten document, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure relate to providing automatic handwriting character recognition using Convolutional Neural Networks (CNNs). In embodiments, a Fully Convolutional Neural Network (FCNN) is implemented and trained to learn and classify symbols from digitized handwriting samples. Lines of text are parsed and then word blocks (word, phone number, surname, group of symbols, etc.) are parsed. Word blocks may be first resampled to fixed height and passed into a first CNN to recognize common words. If the word block is a common word, then processing is done. If the word block is not a common word, the number of symbols per word block may be estimated and used to warp each word block to a canonical form. For example, the word block may be resized to include canonical width spacing of symbols forming the word block based upon the number of symbols (or a predication of the number of symbols) in the word block. The word block along with neighboring word blocks may be passed into a hierarchical FCNN which utilizes information at different resolution scales to determine the sequence of symbols. Then, the sequence of symbols is passed into a statistical based closest word match based upon Character Error Rate (CER). Word blocks are assigned probabilities to nearest words based upon a minimization of CER by adding, deleting, or substituting symbols. After all words in a sentence are extracted, a final recurrent neural network performs statistical based word corrections.

Because recognition of handwritten text is more challenging than machine generated text because of the virtually infinite ways a human can write the same message, deep learning approaches for handwriting analysis may utilize dictionary based architectures and recurrent neural networks. Embodiments of the present disclosure utilize a fully convolutional network architecture to output arbitrary length symbol streams from handwritten text. A preprocessing step normalizes input blocks to a canonical representation, which when combined with a multi-stream contextual filter architecture, negates the need for costly recurrent symbol alignment correction. When a dictionary is known, introduction of a probabilistic character error rate to correct errant word blocks is utilized. This fully convolutional method demonstrates state-of-the-art results on both dictionary based and arbitrary symbol based handwriting recognition.

Embodiments of the present disclosure include a method to obtain character based classification without relying on predefined dictionaries or contextual information. Embodiments of this method can reliably predict both arbitrary symbols as well as words from a dictionary. In certain embodiments, this method utilizes: 1) a CNN architecture for word identification, number of symbols in word block, and by adding multiple streams in the last few layers, to do accurate symbol prediction; 2) introduction of a probabilistic character error rate that penalizes symbol insertion and deletion more than symbol replacement; and 3) creation of a realistic block based dataset derived from the recently released NIST single character dataset. Certain embodiments of the present disclosure demonstrate state-of-the-art results on both dictionary based and arbitrary symbol based handwriting recognition benchmarks.

Embodiments of the present disclosure describe systems and methods for extracting symbols from a digitized object for character recognition. In embodiments, a system architecture providing one or more neural networks, such as a Fully Convolution Network are utilized to analyze digitized images. In embodiments, the networks determine line whitespace to form digitized line blocks. The methods may also include transforming digitized line blocks into a one or more word blocks separated by whitespace, and recognizing symbols in each word block. In embodiments, recognition of symbols in each word block includes transforming each word block to a canonical representation of fixed height. The recognition may also include passing each stream of symbols and blanks into a first dictionary checker to assign most common words. If stream of symbols and blanks is amongst most common words the method may end. Otherwise, the method includes passing each stream of symbols and blanks into a second word block descriptor generator. The method also includes passing each stream of symbols and blanks into a third word length prediction to resize word block to canonical width spacing of symbols, where the width is based upon a prediction of the number of symbols in the word block. Moreover, in embodiments the method further includes passing each resized word block along with word block descriptors through a fourth fully convolutional neural network trained which determines symbols and blanks. The method may also include passing symbols and blanks through a symbol based probabilistic correction. Additionally, the method may include outputting determined symbols in word block from first dictionary checker, the symbol specific translator, or combination thereof.

Embodiments of the present disclosure describe a system and method for predicting words and/or symbols from handwriting text. In embodiments, the words and/or symbols may include phrases, addresses, figures, special characters, or a combination thereof. In embodiments, a digitized object includes an electronic or digital capture. Non-limiting examples include electronic images (e.g., JPEG, TIFF, GIF, etc.), PDFs, photos, screenshots, digital representations, or a digital encoding of an object representation (e.g., source code or html). In embodiments, the digitized object is analyzed for whitespace separators to form digitized line blocks. Thereafter, the digitized line blocks may be converted into one or more word blocks. In embodiments, the word blocks are identified due to separation by whitespace. Thereafter, a neural network, such as a FCNN, CNN, or the like may be utilized to evaluate and recognize the symbols in the word block. For example, the word block may be transformed to a canonical representation of fixed height. Moreover, a stream of symbols and blanks forming the word block may be passed into a first dictionary checkers to assign most common words to the word block. That is, the word block may be analyzed and compared to common words in the dictionary. In embodiments where a match is present, the process may stop and the matched word may be output. Otherwise, the word block may be passed through a fully convolutional neural network that is trained to determine symbols and blanks. Additionally, in embodiments, probabilistic correction may be applied to the symbols recognized by the neural network. Thereafter, determined symbols in the word block are output from the first dictionary checker, from a symbol specific translator, or a combination thereof.

In certain embodiments, the CNN may include a length prediction to resize word blocks to canonical width spacing for the symbols. The width may be based upon a prediction of the number of symbols in the word block. Additionally, in certain embodiments, duplicate symbols may be deleted from word blocks. The system may determine the likelihood that a symbol is a duplicate by evaluating a proportional likelihood for symbol occurrence. For instance "qq" may be very unlikely when evaluating words in the English language, thereby providing a high likelihood that evaluation of "qq" includes a duplicate. Moreover, other adaptive methods may be utilized to determine duplicates. Additionally, in embodiments, blank prediction and length prediction may be used to resize word blocks to canonical widths. For example, blank prediction between symbols may be used to resize the width of each symbol such that each symbol is of equal width.

In certain embodiments, LSTM may be utilized to clean an output from the FCNN. For example, LSTM may be trained by matching spelling mistakes to their nearest correct words. A dictionary size utilized with the LSTM may be varied to suit the specific needs or tasks. The output from the FCNN may also be cleaned using iterative nearest character error rates (CER). For example, word probabilities are assigned to each word block by inserting, deleting, or substituting symbols to match a dictionary of word blocks based upon probability of each symbol.

It should also be appreciated that certain embodiments include a receptive field of the FCNN that is varied based upon CNN receptive field predictors. In certain embodiments, the FCNN symbol predictor uses a hierarchy of receptive fields to make predictions, whereby the hierarchy of receptive fields can include multiple portions of one or more symbols before and after each target symbol. Additionally, the hierarchy of receptive fields can include multiple portions of one or more word blocks before and after each symbol. Also, in certain embodiments, the hierarchy of receptive fields can include multiple portions of one or more word blocks before and after each symbol, even if word blocks occur on different lines. Furthermore, in certain embodiments, the hierarchy of receptive fields can include multiple portions of one or more sentences before and after each symbol, even if the sentences occur on different lines, paragraphs, or pages.

In certain embodiments, the FCNN symbol predictor can scan a batch of forms and use correlation statistics from one form to the next for symbol prediction. For example, the batch of forms may have substantially the same arrangement where a first word on each form is always or substantially always the same. As a result, the symbol predictor can determine that the likelihood of the first word being the same on each form is highly likely.

Embodiments of the present disclosure may include a symbol predictor that uses a first CNN detector to determine a class of the word blocks. Non-limiting examples include ICR v. OCR, font types, language, script (e.g., cursive vs. non-cursive). By pre-processing and determining the class, adjustments to the FCNN symbol predictor may be limited because the word block may be directed to the proper predictor based on the class.

In certain embodiments, post-processing steps may match a word block to a dictionary of words using probabilistic character error rate (CER) which includes symbol probabilities, word probability from a CNN word classifier, a length predictor from a CNN words length predictor, word block type classifier, prior statistical probabilities of word blocks, and/or contextual probabilities such as words in sentences. In certain embodiments, the probabilistic CER penalizes symbol insertion and deletion more than symbol replacement.

Embodiments of the present disclosure may further be directed to a machine to generate predictions of word blocks for hand-written text. In embodiments, the machine is in communication with one or more dictionary databases having commonly used words and/or less common words associated therewith. The machine may include one or more processors, such as microprocessors, and one or more non-transitory memories that store instructions to be performed by the one or more processors. In certain embodiments, the machine includes input/output units that may be in communication with the one or more processor, one or more memories, and/or the dictionary databases. In certain embodiments, the one or more memories include instructions stored thereon, for example in the form of a computer program that defines a digitized object analyzer. The digitized object analyzer, that may be a computer program, may include instructions that analyze digital objects to thereby determine one or more line whitespace separators. It may also generate digitized line blocks. These digitized line blocks may be transformed into one or more word blocks separated by whitespace. In embodiments, the machine also includes a word block predictor, which may be a computer program, stored on the one or more memories with instructions to transform each word block of the one or more word blocks to a canonical representation of fixed height. Additionally, the word block predictor may pass each stream of symbols and blanks of the one or more word blocks into a first dictionary checker, the first dictionary checker in communication with the dictionary database comprising a list of common words that is compared to the stream of symbols. In certain embodiments, the word block predictor outputs a dictionary predicted word if the stream of symbols and blanks of the one or more word blocks correspond to a word in the dictionary database. Thereafter, the word block predictor may pass each word block of the one or more word blocks through a fully convolutional neural network to determine the symbols and blanks of the one or more word blocks when the symbols and the blanks of the one or more word blocks do not correspond to a word in the dictionary database. The word block predictor may also perform probabilistic correction on the symbols and blanks of the one or more word blocks to thereby generate a predicted word. Furthermore, the word block predictor may out the predicted word of the one or more word blocks. In this manner, hand-written text may be analyzed and predicted.

FIG. 1 is a schematic diagram of an embodiment of a handwritten document 10 having a plurality of lines of text 12. As illustrated in the embodiment of FIG. 1, the handwritten document 10 is directed toward a meeting agenda having the plurality of lines of text 12 arranged along various sections of the handwritten document 10. Furthermore, the handwritten document 10 includes punctuation characters 14 positioned throughout the line of text 12. For example, in the illustrated embodiment, the punctuation characters 14 include periods, commas, semi-colons, and the like. However, it should be appreciated that other punctuation characters 14, such as brackets, parentheses, exclamation points, question markets, and the like may be also utilized. Moreover, in some embodiments, symbols such as ampersands, pound signs, dollar signs, and the like may also be considered punctuation characters 14 for the purposes of analyzing and separating word blocks from the line of text 12. As will be described in detail below, the lines of text 12 of the handwritten document 10 may be analyzed and processed to separate the lines of text 12 into word blocks for further processing.

Figure 2:
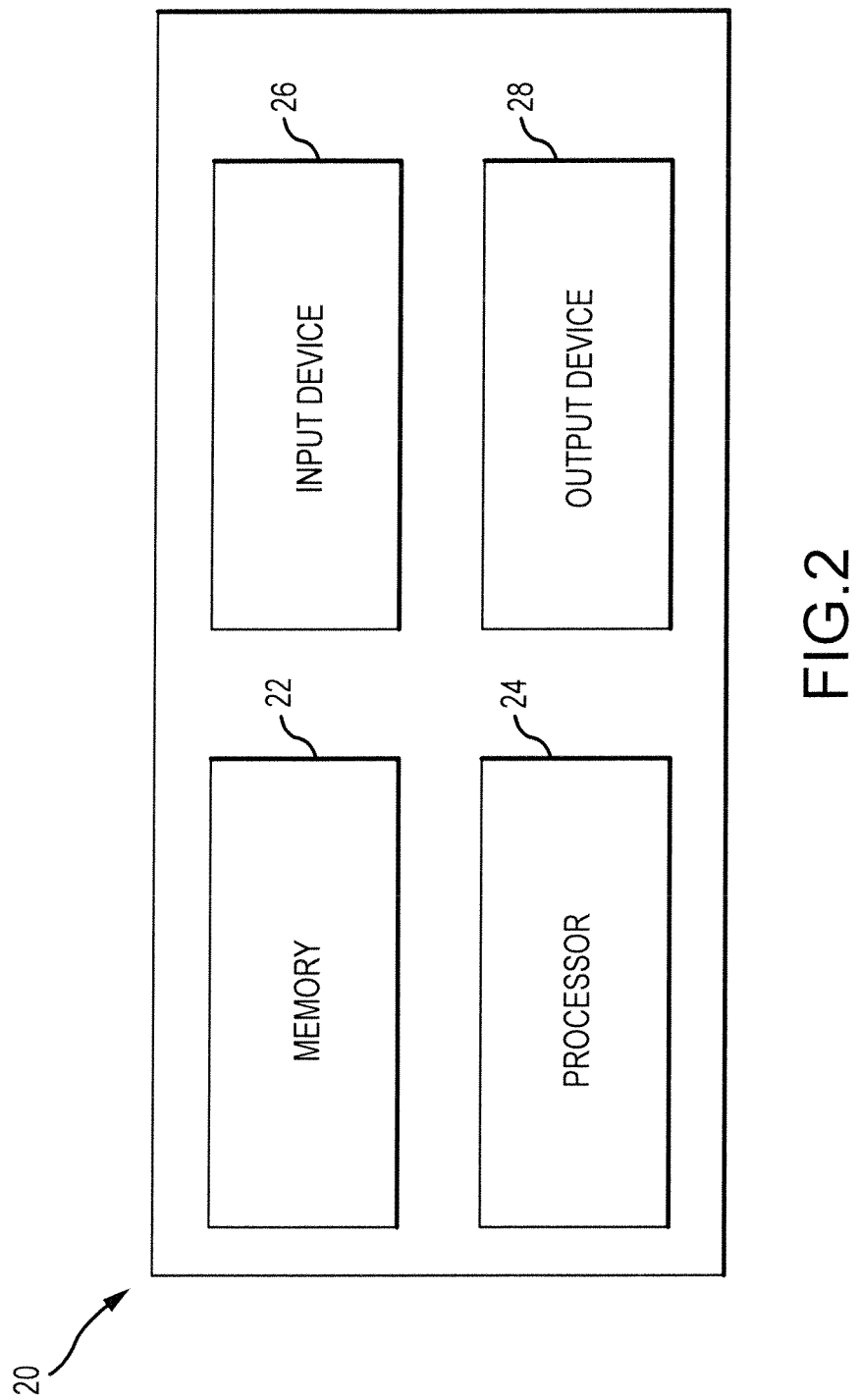
FIG. 2 is a schematic block diagram of an embodiment of a computer system, in accordance with embodiments of the present disclosure.

FIG. 2 is a schematic diagram of a computer system 20 that may be utilized to perform one or more computer operations in order to digitize an image, extract words or phrases from the image, and subsequently process the words or phrases to identify the handwritten text. In the illustrated embodiment, the computer system 20 includes a memory 22, a processor 24, an input device 26, and an output device 28. For example, in certain embodiments, the memory 22 may be a non-transitory (not merely a signal), tangible, computer-readable media, such as an optical disc, solid-state flash memory, or the like, which may include executable instructions that may be executed by the processor 24. As will be described in detail below, the memory 22 may receive one or more instructions from a user to access and execute instructions stored therein.

Furthermore, as shown in FIG. 2, the input device 26 is communicatively coupled to the memory 22 and the processor 24 and may include a photo scanner, a universal serial bus (USB) interface coupled to a device such as a personal electronic device, camera, tablet, electronic drawing pad, or the like, or other communication input device, such as an Ethernet cable. Moreover, the input device 26, in certain embodiments, may be a wireless communication device, such as a BLUETOOTH transceiver, a near-field communication transceiver, a wireless internet transceiver, or the like. In this manner, the computer system 20 is structured to receive information from devices and documents outside of the computer system 20 via the input device 26.

Additionally, in the embodiment illustrated in FIG. 2, the computer system 20 includes the output device 28. For example, the output device 28 may be a screen (e.g., a monitor) to enable the user to view and/or review information from the computer system 20. For example, the output device 28 may be utilized to perform the initial learning protocols of the CNN to enable subsequent analysis and processing of the handwritten document 10. Furthermore, the output device 28 may be utilized to interact with the computer system 20 such that the user can provide instructions to the computer system 20.

Figure 3:
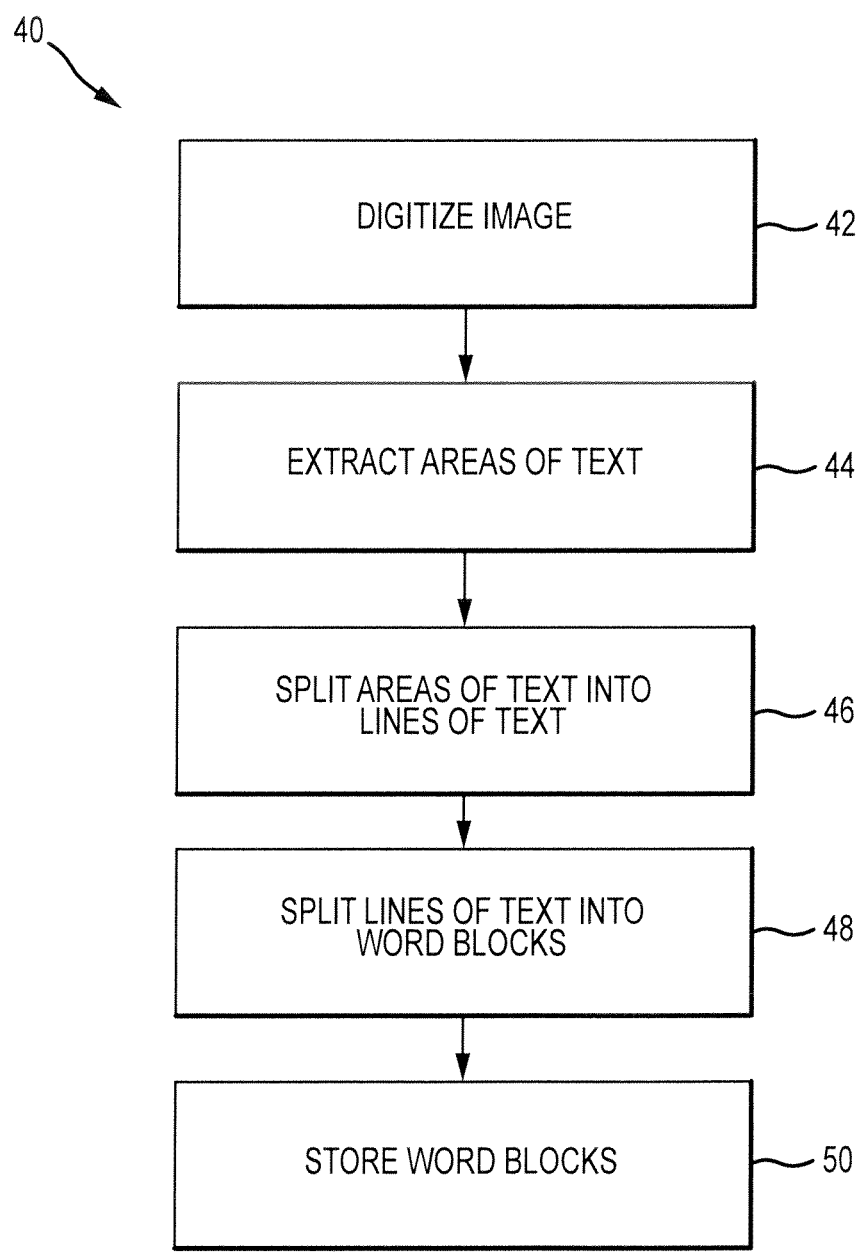
FIG. 3 is a flow chart of an embodiment of a method for extracting word blocks from a handwritten document, in accordance with embodiments of the present disclosure.

FIG. 3 is a block diagram of an embodiment of a method 40 for extracting areas of text from the handwritten document 10 into one or more word blocks. In the illustrated embodiment, the method 40 begins with obtaining a digital image (block 42), for example, via the input device 26. In certain embodiments, the user may scan a physical document, such as an invoice, a tax document, a questionnaire, or the like for storage (either permanent or temporary) in the memory 22. As such, the once physical document with handwritten text may be converted to a digital image for further processing. Moreover, in certain embodiments, the digital image may be obtained from any online content, any type of digital capture, such as a photograph or video, or the like. Next, areas of text may be extracted from the handwritten document 10 (block 44), for example, by utilizing the computer system 20. For example, regional based classifiers or pixel based segmentation may be utilized to extract areas of text from the handwritten document 10. This area of text may be referred to as a text block and contain one or more word blocks, as will be described below. Subsequently, these areas of text (e.g., text blocks, word blocks, etc.) can be utilized to determine the language of the text, the script or penmanship of the text (e.g., cursive, print, or a combination thereof), and whether the text contains letters, numbers, symbols, or a combination thereof. Then, in certain embodiments, the areas of text obtained at block 44 may be split into lines of text (block 46). For example, the area of text may be split into lines of text using modified XY trees or similar methods. Thereafter, the lines of text are separated into word blocks (block 48), for example, via modified XY trees or similar. As used herein, a word block is a string of symbols (such as letters, punctuation, numbers, special characters, or the like) separated by white space. The word block may be formed of words, phone numbers, surnames, acronyms, etc. As will be described below, the word blocks may be input into the CNN for later evaluation and identification. Accordingly, the word blocks may be stored for later use (block 50). It should be appreciated that, in certain embodiments, additional processing may be performed using one or more punctuation detectors to detect and store a string of word blocks to form sentences, and in certain embodiments, paragraphs through the detection and storage of the sentences. In this manner, text can be separated and isolated for later processing via the CNN.

In certain embodiments, the CNN may be referred to as a Fully Convolutional Network (FCN). Moreover, in certain embodiments, the FCN may be a variant of a Visual Geometry Group (VGG) CNN network. For example, one or more groups of (3×3 filter) convolution layers are separated by pooling operations. The input word block is first passed into a first CNN which predicts a word along with the number of symbols, N in the word block. FIG. 4 is a schematic diagram illustrating the baseline architecture used. Starting with the input layer, the architecture is C(64)-C(64)-C(64)-P(2)-C(128)-C(128)-P(2)-C(256)-C(256)-P(2)-C(512)-C(512)-C(1024,4×4, 1×2)-C(1024, 3×9, 0×4)-C(111, 1×1, 0×0), where C(d, h×w, $pad_h \times pad_w$) indicates a convolutional layer with d filters of spatial size h×w (default 3×3) of stride 1 with $pad_h \times pad_w$ padding (default 1×1) and P(s) is a s×s pooling layer of stride s.

Figure 4A:
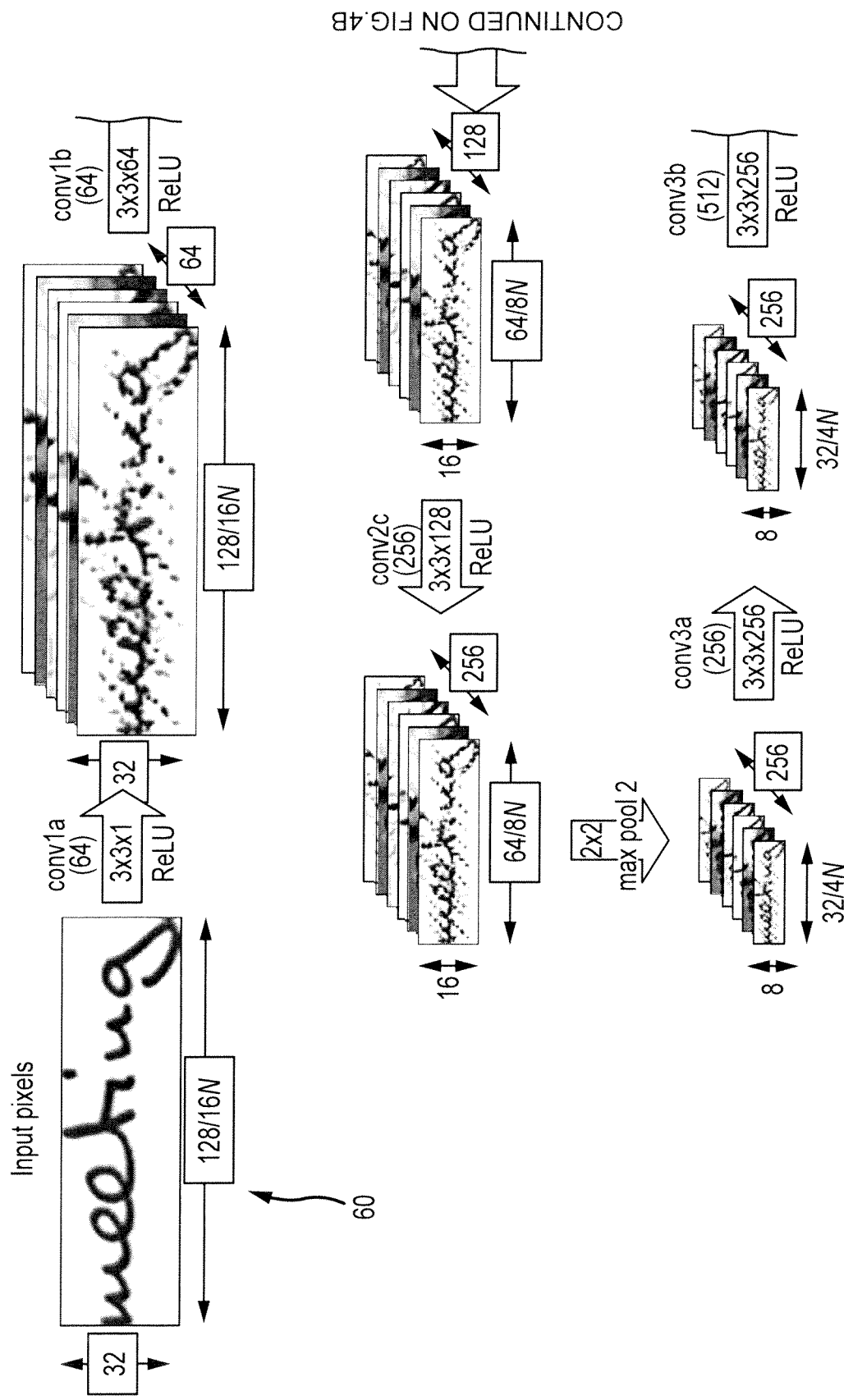
FIG. 4A is a schematic diagram of an embodiment of baseline architecture of a convolutional neural network (CNN), in accordance with embodiments of the present disclosure.
Figure 4B:
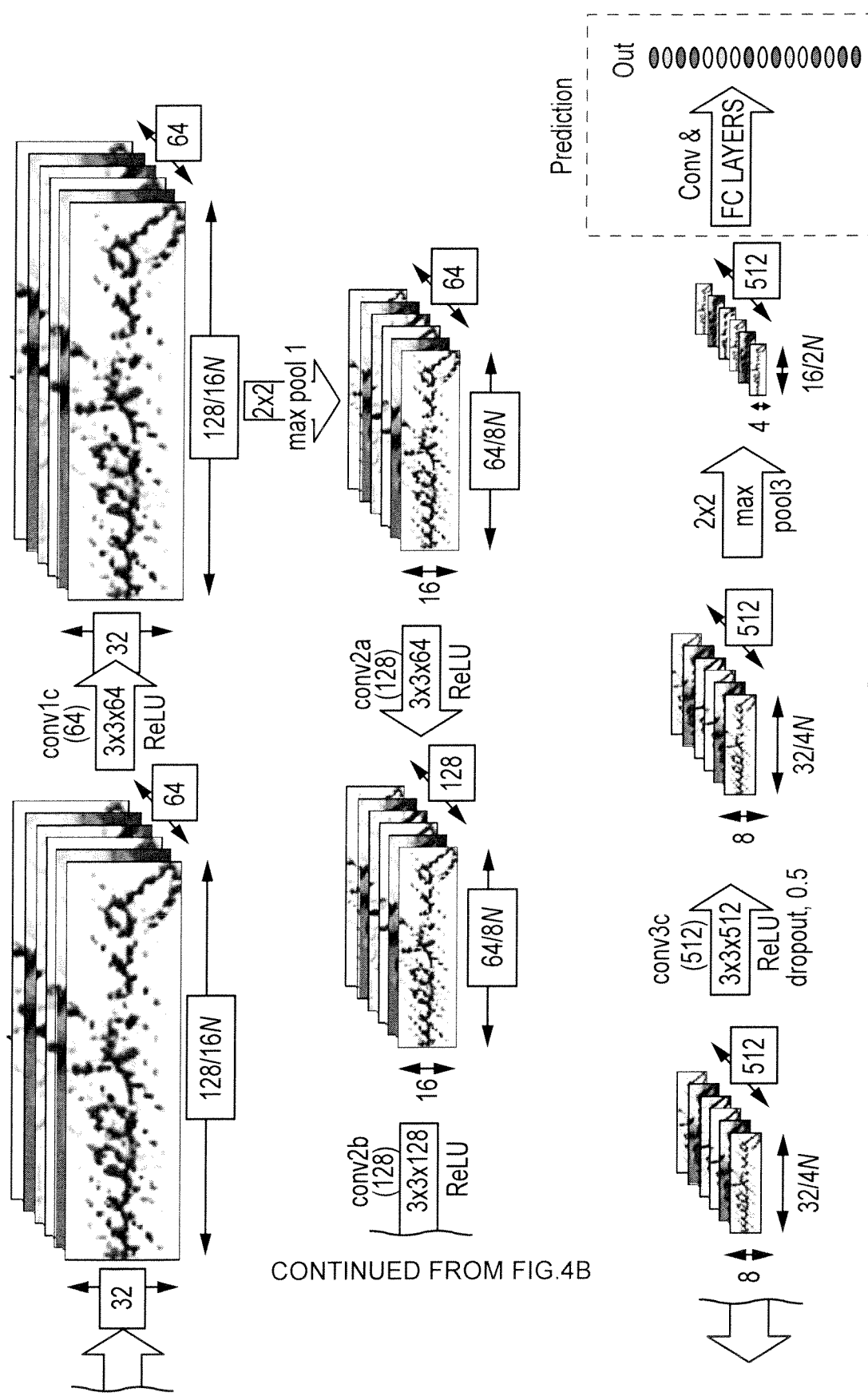
FIG. 4B is a schematic diagram of an embodiment of baseline architecture of a convolutional neural network (CNN), in accordance with embodiments of the present disclosure.

In the embodiment illustrated in FIGS. 4A and 4B, a word block 60 is the input that is directed into the CNN. In the illustrated embodiment, the word block 60 may be an input image of 32×128×1 (imageHeight×imageWidth×imageDepth). The default architecture reduces a 32×16N input image to a (2N+1)×111 prediction, where 111 is the number of symbols (which may include upper and lower English and French alphabets, digits, and special characters).

With respect to FIGS. 4A and 4B, a convolution layer is the application of a convolution filter onto an input image. For example, conv1a, the first convolution operation is a 3×3×1 (filterHeight×filterWidth×filterDepth) filter. If the input image were 32×128×1 (imageHeight×imageWidth×imageDepth) (32×16N×1 in certain embodiments), a convolution operation would result in a 30×126×1 image. The change in dimension is because to apply a 3×3 filter, the first, last, left-most, and right-most pixels are skipped. The change in size is inconvenient. To avoid this inconvenience, the input image can be padded with zeros before convolution. The default padding of 1×1 says to add '1' row of zeroes along the top and bottom and '1' column of zeroes on the left and right. With this padding the input image height and width of 32×128 (32×16N in certain embodiments) remains unchanged after a 3×3 filter. There are 64 conv1a filters, each outputs a 32×128 image (32×16N in certain embodiments), which is called an activation map. After conv1a, we have a 32×128×64 image (32×16N×64 in certain embodiments). The next convolution operation, conv1b is also a 3×3 filter, but the depth changed to match the depth of its input image, which is 64 in this case, thus the filters in conv1b are 3×3×64. Padding once again adds a row of zeros to the top and bottom and a column of zeroes on the left and right. After padding, an image of 34×130×64 is convolved with 3×3×64 filters. Each filter yields a single 32×128 activation map (image). There are (once again) 64 conv1b filters, so the output of this stage is a 32×128×64 image (32×16N×64 in certain embodiments), which is the stacking of all 64 activation maps into a single image.

Pooling reduces the width and height of a stack of activation maps, but not the depth. For example, the max pool 1 operation, reduces the image from 32×128×64 (32×16N×64 in certain embodiments) to 16×64×64 image (16×8N×64 in certain embodiments). One way of doing pooling is to resample the image using nearest neighbor, linear, cubic, etc. filtering. Another method is to use max pooling. Max pooling assigns an output pixel as the maximum (in terms of pixel code value) from a receptive field of pixels. Pooling with a s×s pooling layer of stride s reduces the width and height by a factor of s. If s=2, each 2×2 region of an input image is reduced to a single pixel, where the pixel code value is the maximum code value of the input 2×2 region.

Non-linear operations are inserted between layers of a CNN. Just like a series of matrix multiples can be replaced with a single matrix operation, a series of CNN layers could be approximated with a single layer. By inserting non-linear layers, CNNs can approximate more complex functions. The Rectified Linear Unit, or ReLU, is the non-linear embodiment utilized in FIGS. 4A and 4B. The ReLU operation replaces all input values less than zero equal to zero, while leaving all positive inputs unchanged.

After applying the series of convolutions and pooling operations in FIGS. 4A and 4B, the resulting resolution of the image passed into the prediction layer is 4×16×512 or 4×2N×512, depending on if the input image were 32×128×1 or 32×16N×1.

Figure 5:
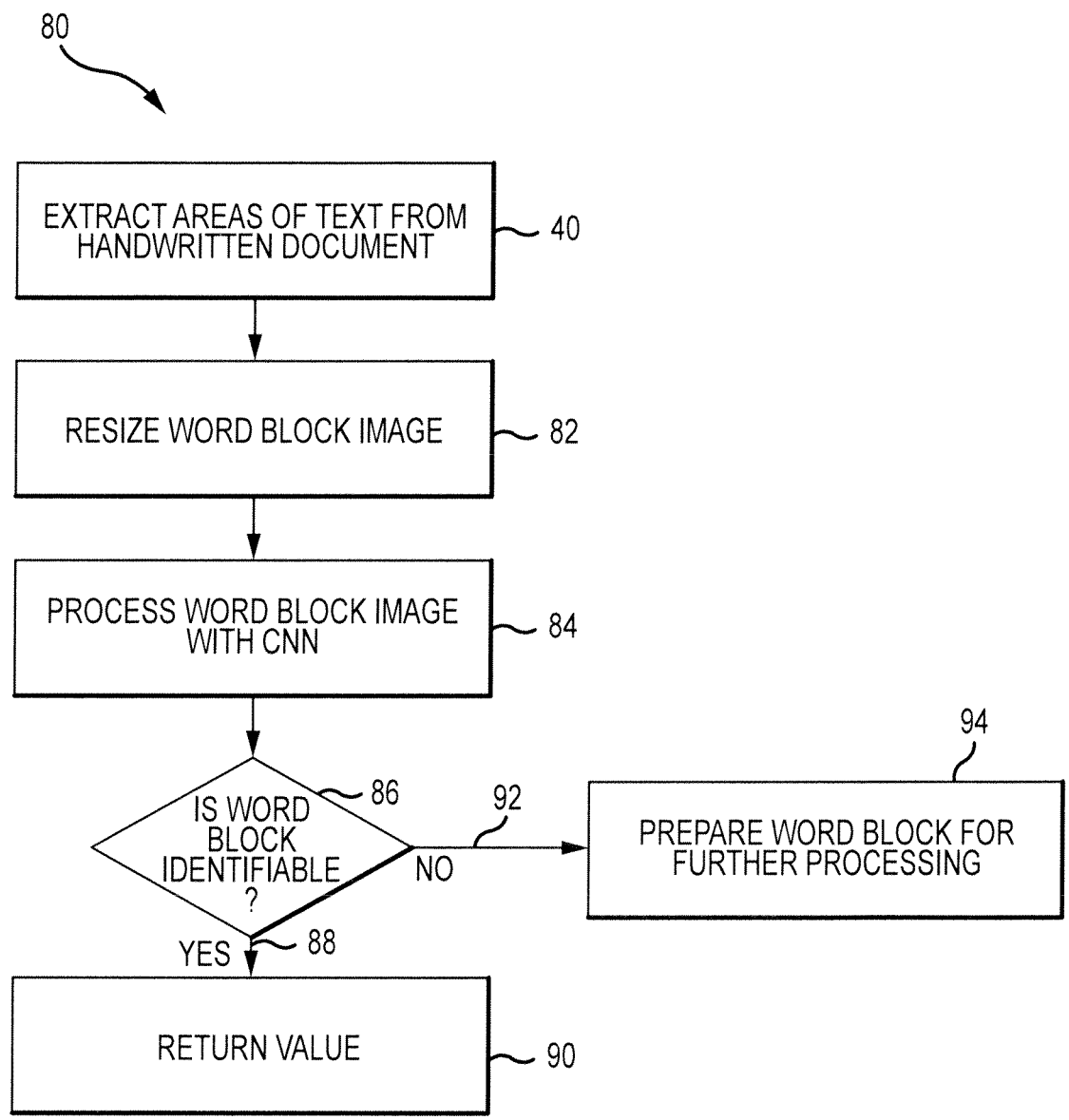
FIG. 5 is a flow chart of an embodiment of a method for processing word blocks with a CNN, in accordance with embodiments of the present disclosure.

In certain embodiments, a first CNN, such as the CNN depicted in FIGS. 4A and 4B, may be used to identify the word block. FIG. 5 is a flow chart of an embodiment of a method 80 to evaluate word blocks with a dictionary CNN to determine the hand written text of the word block 60. The method 80 begins with the method 40 for extracting areas of text described above in FIG. 3. For example, the handwritten document 10 will be digitized and processed to generate word blocks 60. Next, the word block 60 will be resized (block 82). For example, in certain embodiments, the word block 60 will be resized to 32×128. As a result, different sized word blocks 60 may be evaluated using the same CNN without taking the size of the text into account. Thereafter, the word block 60 is processed by the CNN, for example, the CNN similar to the CNN described in FIGS. 4A and 4B (block 84). This first CNN can either predict which word from a dictionary has been input, the length of the word, or both. Thereafter, the word block 60 is analyzed to determine if the characters and/or features forming the word block 60 are identifiable (operator 86). For example, in certain embodiments, the CNN may include a dictionary or lexicon containing a database of common words (e.g., the 500 most common words in a language, the 600 most common words in a language, the 700 most common words in a language, the 800 most common words in a language, the 900 most common words in a language, or any suitable size database of common words). As the word block 60 is processed by the CNN, the results may be evaluated against the database of common words to determine if further processing is necessary. For example, if the word block 60 is identifiable (line 88), the value found in the dictionary is returned as an output (block 90). However, if the word block 60 is not identifiable (line 92), the word block 60 is prepared for further processing, for example, in another CNN (block 94). It should be appreciated that, in certain embodiments, the other CNN may be the same CNN that previously processed the word block 60, however, with a different input size or output predictor, such as determining the number of symbols in the word block 60. In this manner, handwritten text from handwritten documents 10 may be evaluated and processed.

In certain embodiments, as described above, the CNN may include one or more convolutional steps, one or more non linearity steps, and/or one or more pooling steps in order to process the word block 60. One architecture for lexicon prediction is C(64)-C(64)-C(64)-P(2)-C(128)-C(128)-P(2)-C(256)-C(256)-P(2)-C(512)-C(512)-FC(2018)-Dropout (0.5)-FC(V) and for length prediction is C(64)-C(64)-C(64)-P(2)-C(128)-C(128)-P(2)-C(256)-C(256)-P(2)-C(512)-C(512)-FC(256)-FC(64)-Dropout(0.5)-FC(d), where FC(x) is a fully-connected layer with x filters. For lexicon prediction, V is the size of the dictionary. For length prediction, d=32, giving 32 classes; able to predict sequence lengths from 1-32.

It should be appreciated that, in certain embodiments, while performing the method 80 described in FIG. 5, certain parameters and/or confidences may be evaluated to determine if the word block 60 is identifiable. For example, if the confidence of this first CNN is greater than τ, the word block 60 has been deciphered and the program exits, as described above. If the confidence is less than T, the BlockLength CNN is utilized to predict N, where N is the number of symbols of the word block 60. For example, the output of the BlockLength CNN is resampled the word block 60 to 32×16N pixels, where N is the number of symbols reported from the first CNN. This resampled word block is input to a second CNN. In certain embodiments, the second CNN is referred to as the Symbol CNN and is fully convolutional. The fully connected layers are replaced with fully convolutional layers, -FConv(256,4,w)-FConv(256,1,7)-FConv(SymLength,1,1)-SoftMax, where FConv(d; h; w) is a fully convolutional layer with d filters of spatial size (h×w) of stride 1 as shown in an embodiment of a fully convolutional layer represented in FIGS. 6A and 6B.

Figure 6A:
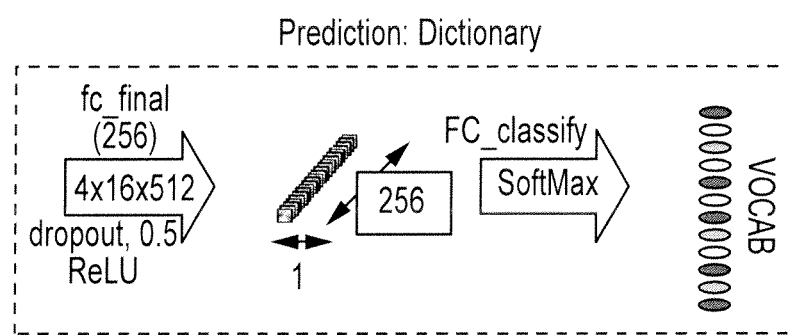
FIG. 6A is a schematic diagram of an embodiment of a fully convolutional neural network, in accordance with embodiments of the present disclosure.
Figure 6B:
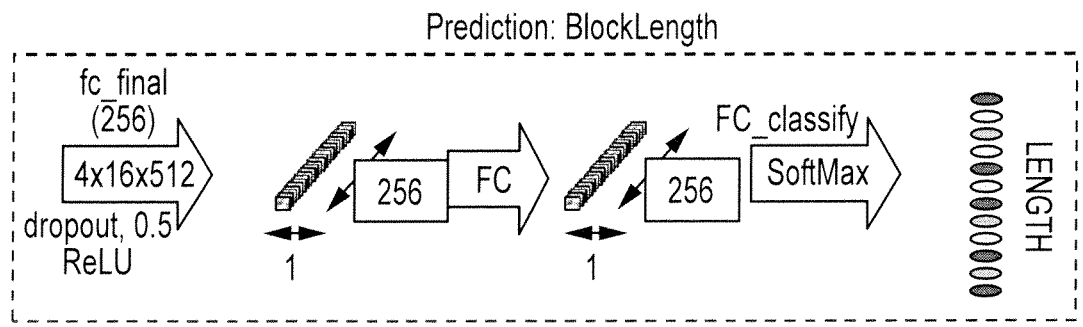
FIG. 6B is a schematic diagram of an embodiment of a fully convolutional neural network, in accordance with embodiments of the present disclosure.

FIGS. 6A and 6B are schematic diagrams of the Prediction step of FIGS. 4A and 4B, representing an output based on the dictionary look up described above with reference to FIG. 5 (FIG. 6A) and a symbol length prediction (FIG. 6B). As shown in FIG. 6A, in certain embodiments, processing through the CNN may be sufficient to predict the output of the word block 60 based on a comparison with a dictionary having a number of pre-stored words (e.g., 800 words) that are most likely to appear in a given language. As illustrated in the embodiment depicted in FIG. 6A, the input continues from the CNN illustrated in FIGS. 4A and 4B and fc_final includes an input of 4×16×512. In the illustrated embodiment, the filter is the same size as the image. As a result, after filtering, the output will have a height of 1 and width of 1 because the filter will not slide in the left-right directions or the up-down direction because the filter is the same size as the input image. The input is subsequently processed utilizing the illustrated FC_classify SoftMax. As illustrated, the FC_classify SoftMax step is fully connected, and thereafter the output will be yield a predicted word. In this manner, as described above, hand written text in the word block 60 may be evaluated and predicted by the CNN.

In the embodiment illustrated in FIG. 6B, the number of symbols N in the word block 60 is predicted. For example, as described above, if the confidence of the prediction based on the dictionary CNN is less than given threshold, the image may be further evaluated to enable determination of the number of symbols in the word block 60 and subsequently prediction of the letters, numbers, characters, etc. forming the word block 60. In the illustrated embodiment, the Prediction step of the CNN illustrated in FIGS. 4A and 4B is called BlockLength and is utilized to determine the number of symbols in the word block 60. In the illustrated embodiment, the initial input is 4×16×512. As described above, the filter applied during the fc_final step is the same size as the input image, and as a result, the output has a height of 1 and a width of 1 because the filter is unable to slide in the left-right directions or the up-down directions. As illustrated, a fully connected hidden layer FC is utilized in the BlockLength predictor. Thereafter, FC_Classify SoftMax processes the image and outputs the length of the word block 60, that is, the number of symbols (N) forming the word block 60. As will be described below, because the number of symbols can be predicted, subsequent processing using a CNN (for example, the same CNN illustrated in FIGS. 4A and 4B) can be utilized to predict the content of the word block 60. In certain embodiments, SymLength is the number of unique characters in the alphabet (upper/lower case, numbers, punctuation, etc.), and is 96 by default for English recognition. However, it should be appreciated that the SymLength may be any number of unique characters, such as 80, 90, 100, 200, 300, 400, or any suitable number. Furthermore, the width w may vary from document to document.

Figure 7:
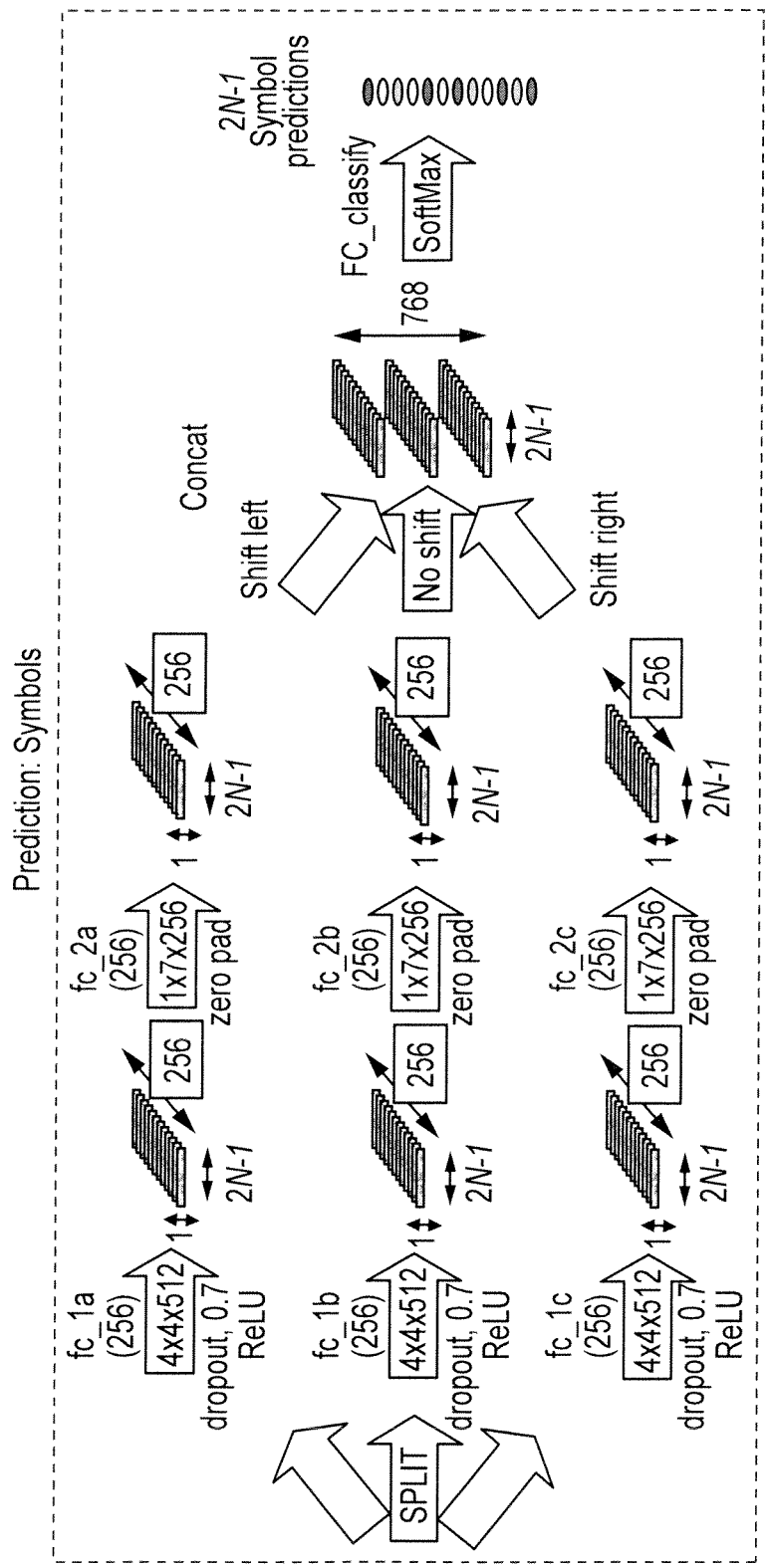
FIG. 7 is a schematic diagram of an embodiment of a predictive convolutional neural network, in accordance with embodiments of the present disclosure

FIG. 7 is a schematic diagram of fully convolutional layers for symbol prediction. In the illustrated embodiment, FIG. 7 may be a continuation of the steps utilized in FIGS. 4A, 4B, 6A, and 6B. In other words, the diagram illustrated in FIG. 7 may be utilized to predict the symbols forming the word block 60 after the image is processed in the CNN and the CNN is utilized to determine the number of symbols forming the word block 60. In the illustrated embodiment, the three arrows marked "Split" splits the single input into three different streams, represented by the arrows. In certain embodiments, the three different streams are identical or substantially identical. As illustrated in FIG. 7, the 4×2N× 512 buffer is split into three streams, and then merges through concatenation before the final fc_classify layer. In the illustrated embodiment, the image is split to form images of 4×2N×512. Although each of the three streams have identical or substantially identical configurations, before concatenation, the upper stream is shifted to the left by one pixel and the lower stream is shifted to the right by one pixel. Specifically, the upper stream 2N×256 buffer is shifted to the left, padding the left-most column with zeros, and discarding the right-most column. The lower stream is shifted similarly, but in the opposite direction. The shifting causes the middle stream to learn generally or substantially centered symbols, and the upper-lower streams to learn symbols that errantly lie to the right/left of their central position. It should be appreciated that, in certain embodiments, the centering of symbols may be referred to as "perfectly centered," however, this should not be interpreted to mean that the symbol must be exactly centered along an axis. Instead, "perfectly centered" should be read to include substantially or generally centered, as well as proximate centering within a given range or tolerance.

In the illustrated embodiment, the filter applied to the input images has the same height and depth of the input images, and as a result, the filter cannot move in the up-down directions or the in-out directions of the image. However, the filter can slide in the left-right directions on the image. As a result, the output is has a height of 1 and a width of 2N−1. In the illustrated embodiment, a subsequent convolution step takes place with a filter having a size of 1×7×256. This filter adds symbols (up to three to the left or right) to extend the receptive field. In other words, the extended receptive field adds context to the symbols being evaluated to account for potential errors in the boundary lines. That is, because the symbols may not all be the same width (e.g., for example, the lower case letter "m" is wider than the lower case letter "l"), the extended filters are utilized to account for the potential difference in width to improve detection and evaluation of the symbols. Accordingly, the size of the filter not only accounts for alignment mismatch, but affords detail stroke information as well as contextual neighbor stroke information. In the illustrated embodiment, the filter slides along the word block 60 and utilizes zero padding such that the output width is the same as in the input width. In other words, the output from the fc_2a convolution steps is 1×2N−1×256, in the illustrated embodiment. Thereafter, in the illustrated embodiment, the three streams are re-combined and evaluated utilizing FC_classify SoftMax to return a prediction for the symbols forming the word block 60. Furthermore, it should be appreciated that, in certain embodiments, a fourth CNN, which may be the same CNN utilized previously, may be incorporated to predict blanks in the word block 60. For example, the fourth CNN, or Blank Prediction may modify and/or warp the word block 60 such that each symbol is the same width, for example, 16 pixels wide. In certain embodiments, Blank Prediction is applied to the word block 60 before being processed by the Symbols CNN, thereby enabling the CNN to determine the blank spaces in the word block 60.

Figure 8A:
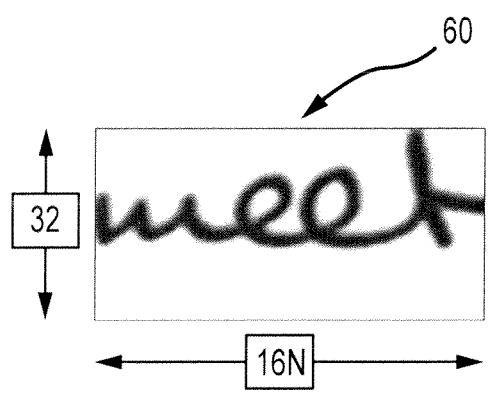
FIG. 8A is a pictorial representation of an embodiment of a word block after pooling and resizing, in accordance with embodiments of the present disclosure.
Figure 8B:
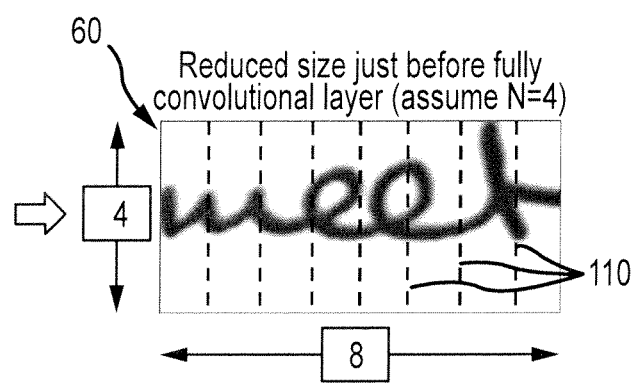
FIG. 8B is a pictorial representation of an embodiment of a word block after pooling and resizing, in accordance with embodiments of the present disclosure.
Figure 8C:
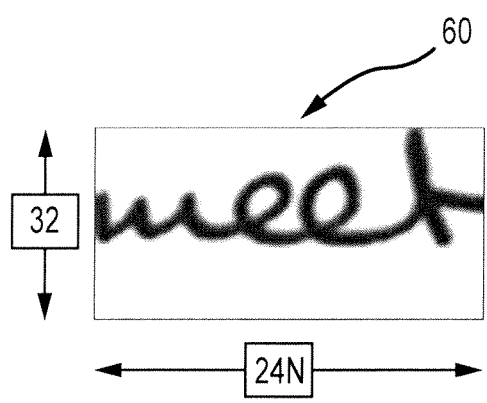
FIG. 8C is a pictorial representation of an embodiment of a word block after pooling and resizing, in accordance with embodiments of the present disclosure.
Figure 8D:
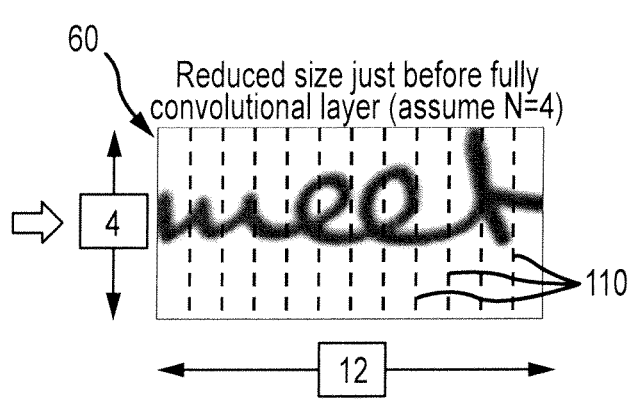
FIG. 8D is a pictorial representation of an embodiment of a word block after pooling and resizing, in accordance with embodiments of the present disclosure.

FIGS. 8A-8D are pictorial representations of an embodiment of the word "meet" as hand written text of a word block 60 after pooling and resizing. In the illustrated embodiment, FIG. 8A shows the word "meet" having a size of 32×16N pixels, although it should be appreciated that, in certain embodiments, the size of the word block 60 may be different. Thereafter, FIG. 8B illustrates the word block 60 after processing with the CNN described above. In the illustrated embodiment, N is assumed to be 4 because FIG. 8A illustrates 4 different characters in the word block 60. Moreover, the size of the word block 60 is 4×8 (e.g., 4×2N where N is 4). As shown, the dashed lines 110 break the image into 8 sections along the longitudinal axis. Furthermore, in certain embodiments, as illustrated in FIGS. 8C and 8D, the word block 60 may be output as a 32×24N imagine that is processed to a 4×12 image. As a result, FIG. 8D illustrates the dashed lines 110 breaking the image into 12 sections along the longitudinal axis. In this manner, the word block 60 may be prepared for filtering.

In the embodiment illustrated in FIGS. 8A-8D, the symbols in the example word block 60 are not of equivalent width. Although, on average, even tap convolution filters alternately align on symbol and blanks, it can be seen substantially perfect alignment (e.g., centering over the symbol) requires each symbol to be of identical width. Wider filters ensure the complete and substantially complete symbol is in the receptive field as the filter steps across the word block 60. Concatenation of multiple receptive fields allows the symbol generation to examine detail stroke information as well as neighbor stroke information. Given sufficient training samples, the symbol alignment with even filters does not pose a symbol recognition problem.

Figure 9A:
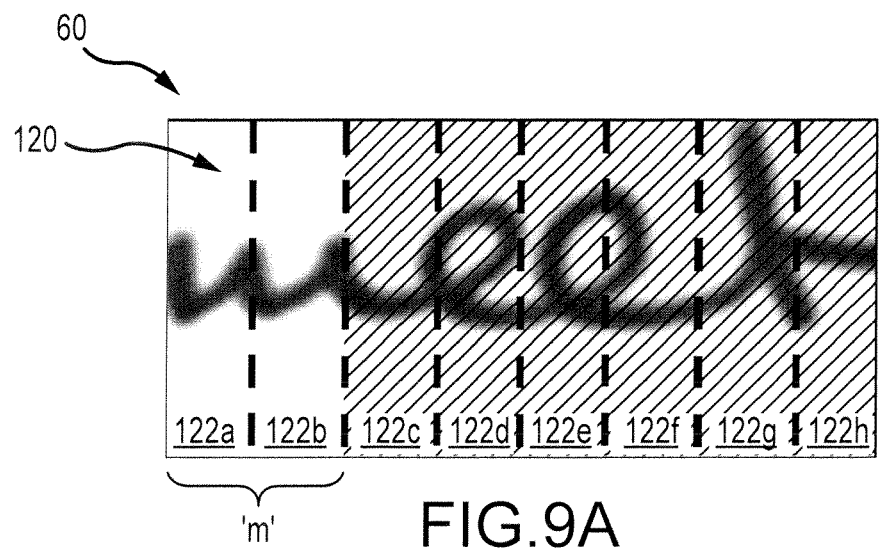
FIG. 9A is a pictorial representation of an embodiment of a receptive field of a two tap even filter across a word block, in accordance with embodiments of the present disclosure.
Figure 9B:
FIG. 9B is a pictorial representation of an embodiment of a receptive field of a two tap even filter across a word block, in accordance with embodiments of the present disclosure.
Figure 9C:
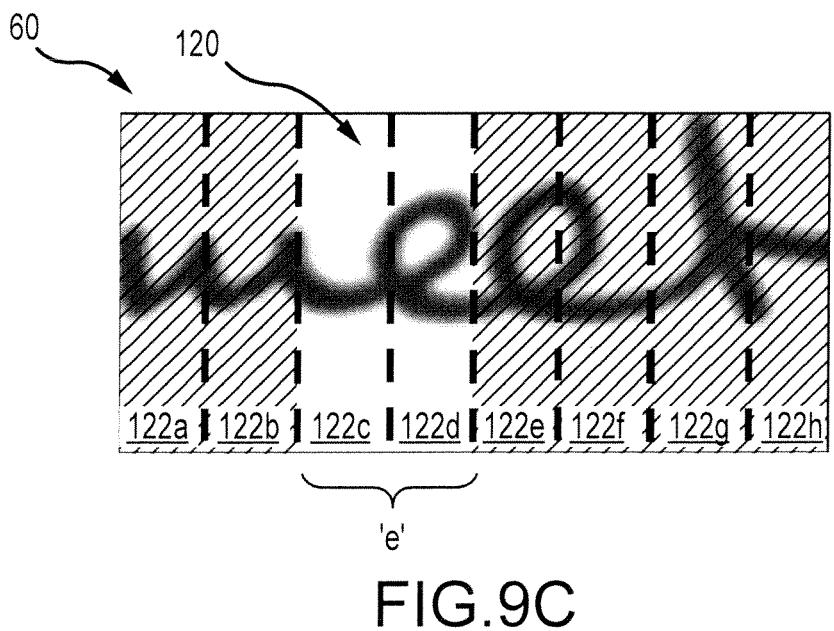
FIG. 9C is a pictorial representation of an embodiment of a receptive field of a two tap even filter across a word block, in accordance with embodiments of the present disclosure.
Figure 9D:
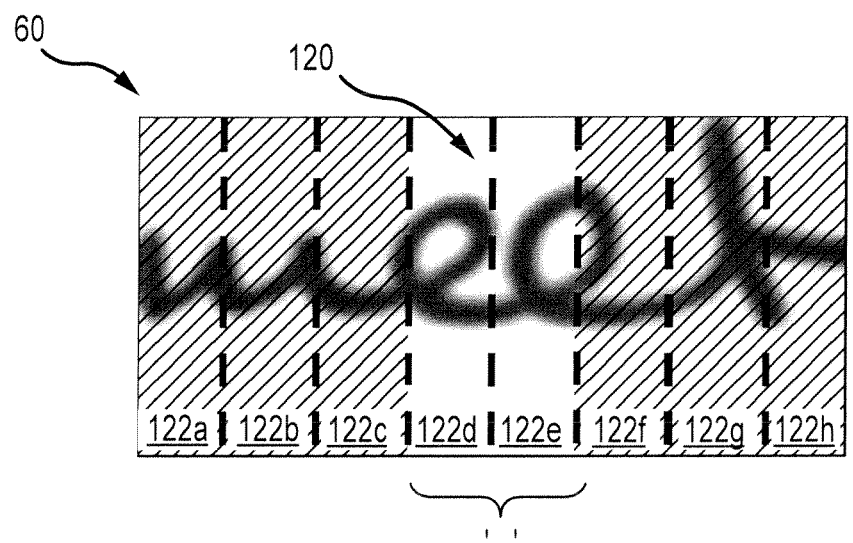
FIG. 9D is a pictorial representation of an embodiment of a receptive field of a two tap even filter across a word block, in accordance with embodiments of the present disclosure.
Figure 9E:
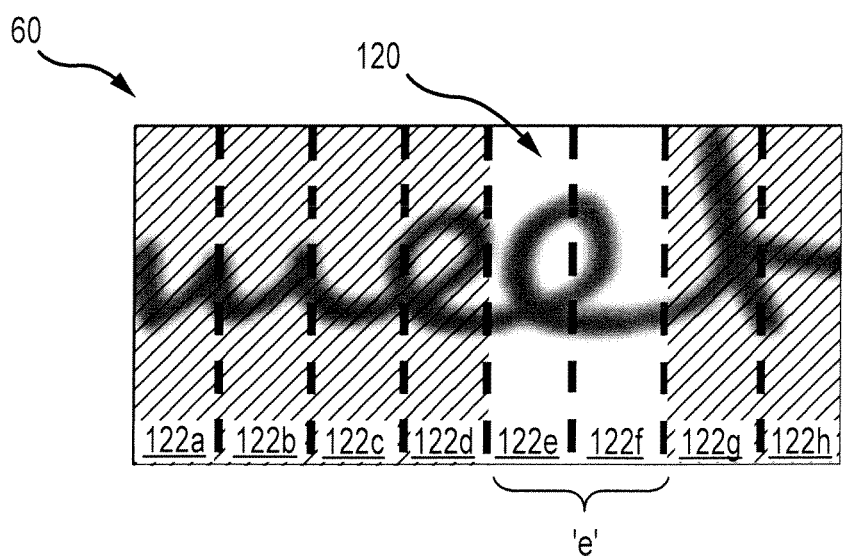
FIG. 9E is a pictorial representation of an embodiment of a receptive field of a two tap even filter across a word block, in accordance with embodiments of the present disclosure.
Figure 9F:
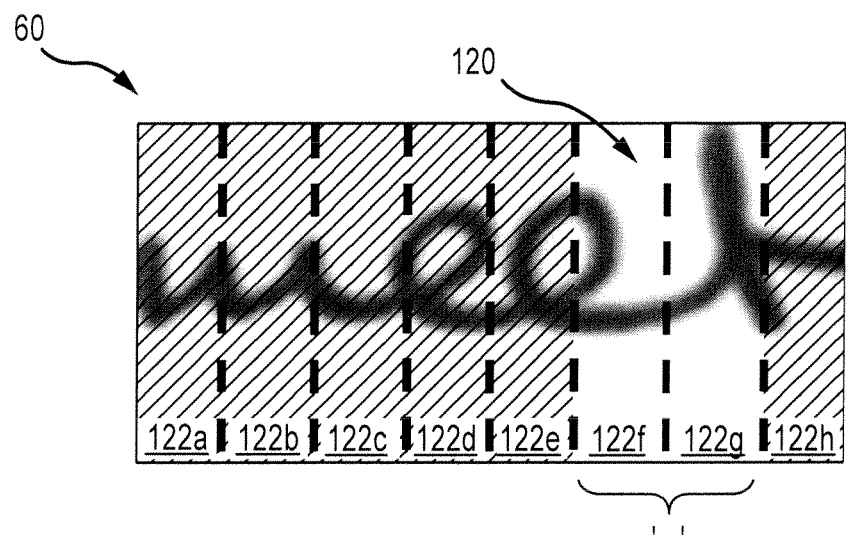
FIG. 9F is a pictorial representation of an embodiment of a receptive field of a two tap even filter across a word block, in accordance with embodiments of the present disclosure.
Figure 9G:
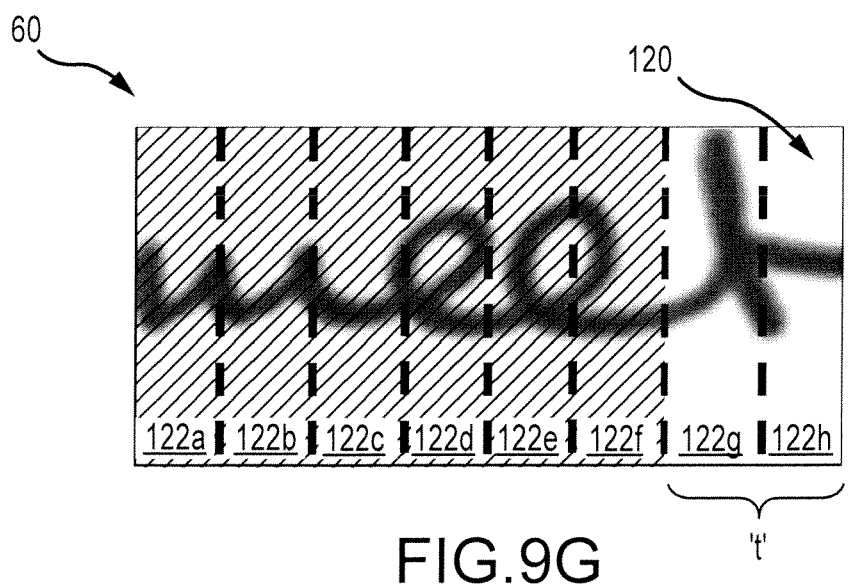
FIG. 9G is a pictorial representation of an embodiment of a receptive field of a two tap even filter across a word block, in accordance with embodiments of the present disclosure.

FIGS. 9A-9G are pictorial representations of a receptive field of a two tap even filter 120 stepping across a 16N wide word block 60. As shown in FIGS. 9A-9G, on average, the filter 120 is centered on a symbol of a blank. That is, as the filter 120 transitions along the word block 60 between the regions 122 separated by the dashed line 110, the filter 120 is either centered over a letter (for example, as shown in FIG. 9A, the letter "m") or over a blank space, as shown in, for example, FIG. 9B. As described above, in certain embodiments, the stride illustrated in FIGS. 9A-9G is one. As a result, in FIG. 9A, the filter 120 is over the regions 122a and 122b. Thereafter, in FIG. 9B, the filter 120 is over the regions 122b and 122c. Accordingly, the filter 120 passes over the word block 60 such that each respective region 122 is evaluated by the filter 120. In this manner, the word block 60 can be processed by the CNN to determine the characters forming the word block 60.

Figure 10A:
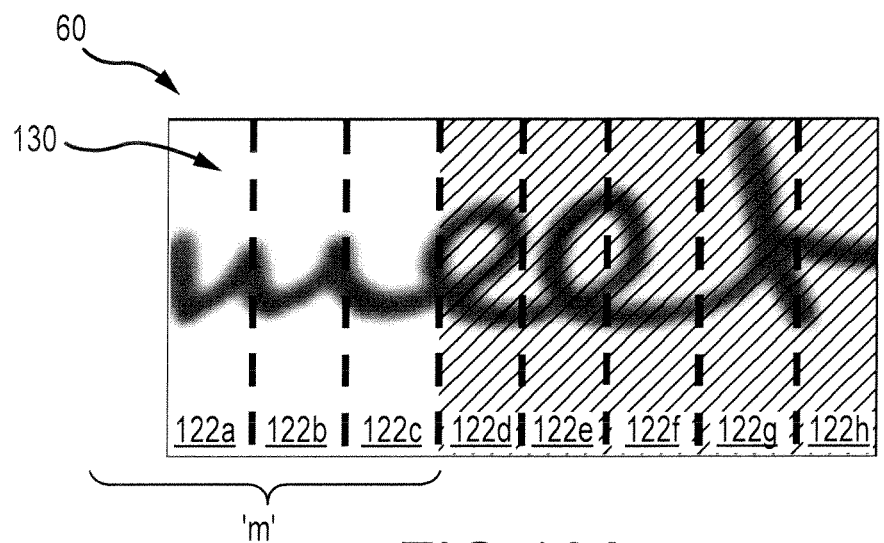
FIG. 10A is a pictorial representation of an embodiment of a four tap even filter across a word block, in accordance with embodiments of the present disclosure.
Figure 10B:
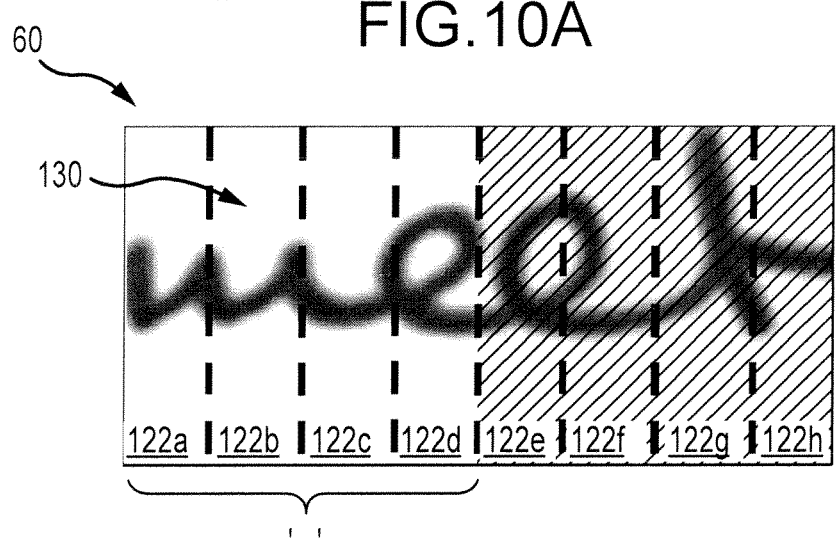
FIG. 10B is a pictorial representation of an embodiment of a four tap even filter across a word block, in accordance with embodiments of the present disclosure.
Figure 10C:
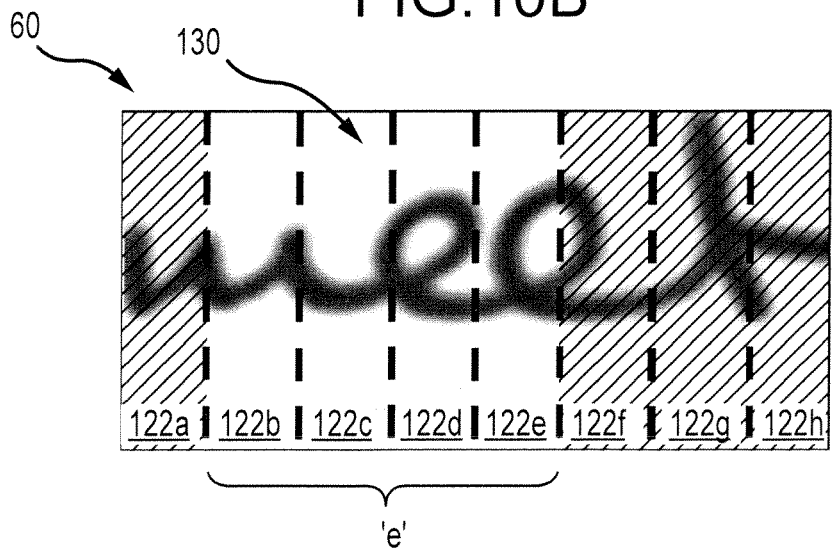
FIG. 10C is a pictorial representation of an embodiment of a four tap even filter across a word block, in accordance with embodiments of the present disclosure.
Figure 10D:
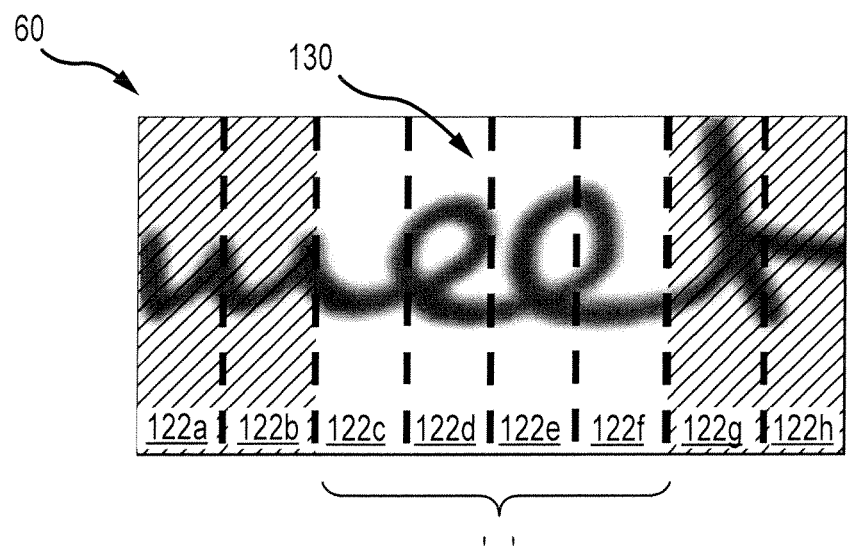
FIG. 10D is a pictorial representation of an embodiment of a four tap even filter across a word block, in accordance with embodiments of the present disclosure.
Figure 10E:
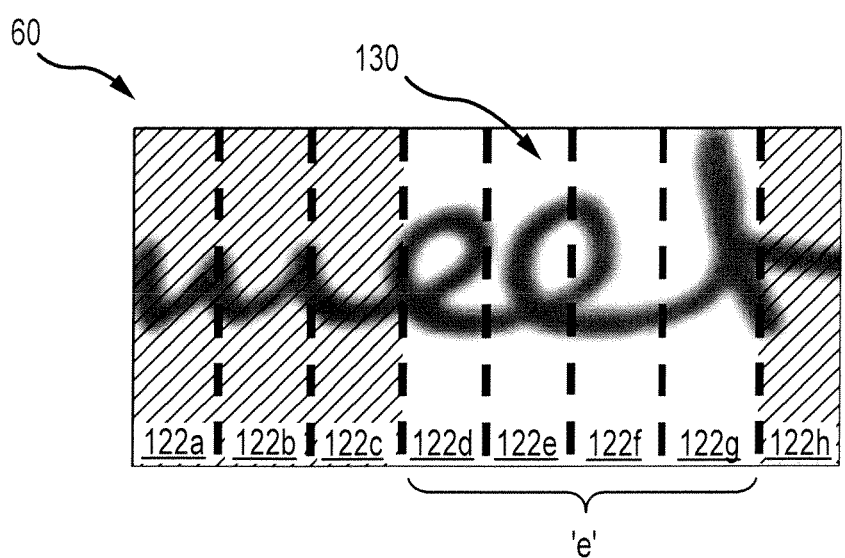
FIG. 10E is a pictorial representation of an embodiment of a four tap even filter across a word block, in accordance with embodiments of the present disclosure.
Figure 10F:
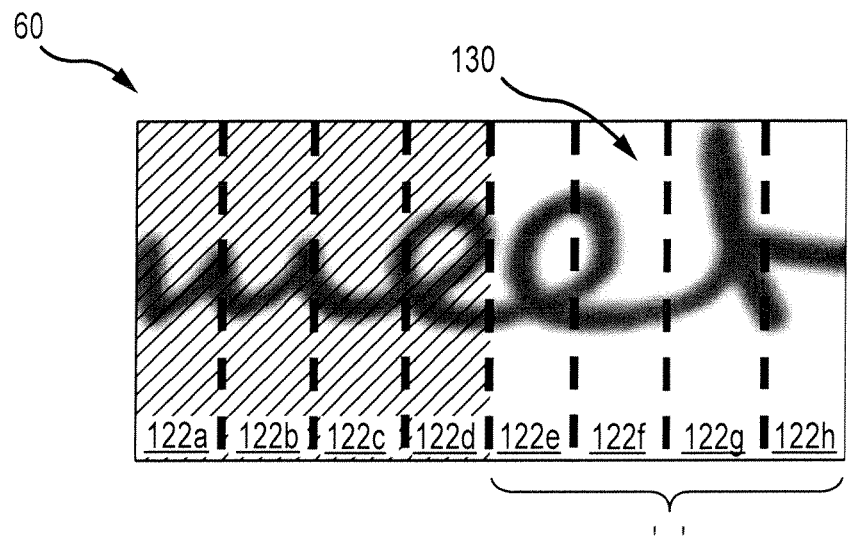
FIG. 10F is a pictorial representation of an embodiment of a four tap even filter across a word block, in accordance with embodiments of the present disclosure.
Figure 10G:
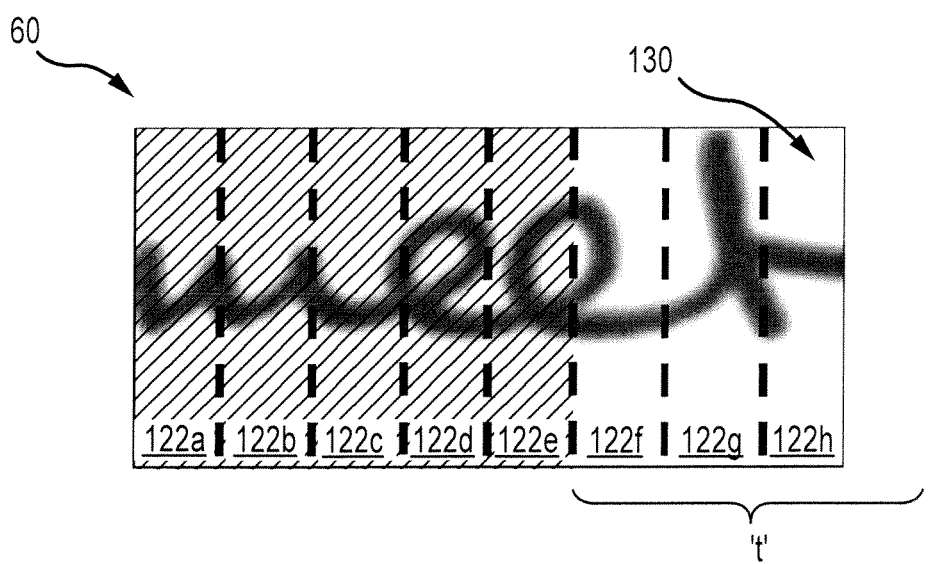
FIG. 10G is a pictorial representation of an embodiment of a four tap even filter across a word block, in accordance with embodiments of the present disclosure.

FIGS. 10A-10G are pictorial representations of a receptive field of a four tap even filter 130 stepping across the same 16N wide word block 60 shown in FIGS. 9A-9G. In the illustrated embodiment, on average, the filter 130 is centered on a symbol or a blank. As shown in FIG. 10A, the four tap even filter 130 includes padding to filter the left-most and right-most symbols forming the word block 60. Padding is utilized to allow filtering on left-most and right-most symbols. In the illustrated embodiment, a pad of Fw/2−1 is used on either side of the block word, where Fw is the width of the filter. The resulting even convolution filter will center or substantially center on N symbols and N−1 blanks as it steps across the word block. For example, a 4×4×512 filter would result in a buffer width of 2N−1. That is, in certain embodiments, the filter 130 may extend beyond the width of the word block 60. As shown in FIG. 10A, the filter 130 is positioned over the regions 122*a*, 122*b*, and 122*c* and therefore recognizes the letter "m" from the word block 60. Similarly to the filter 120 utilized in the embodiment described in FIG. 9, the filter 130 has a stride of 1, and therefore FIG. 10B illustrates the filter 130 positioned over the regions 122*a*, 122*b*, 122*c*, and 122*d*. Additionally, in FIG. 10B, the filter 130 returns a blank. As such, the filter 130 will center on N symbols and N−1 blanks as it steps across the word block 60. Accordingly, as the filter 130 moves across the word block 60, the characters forming the word block 60 are subsequently evaluated and recognized, thereby enabling the CNN to determine the characters forming the word block 60.

Figure 11A:
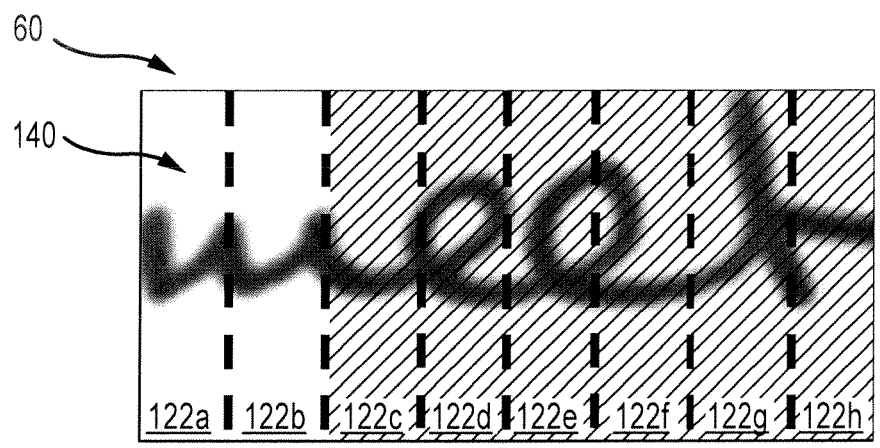
FIG. 11A is a pictorial representation of an embodiment of a 3-wide odd filter across a word block, in accordance with embodiments of the present disclosure.
Figure 11B:
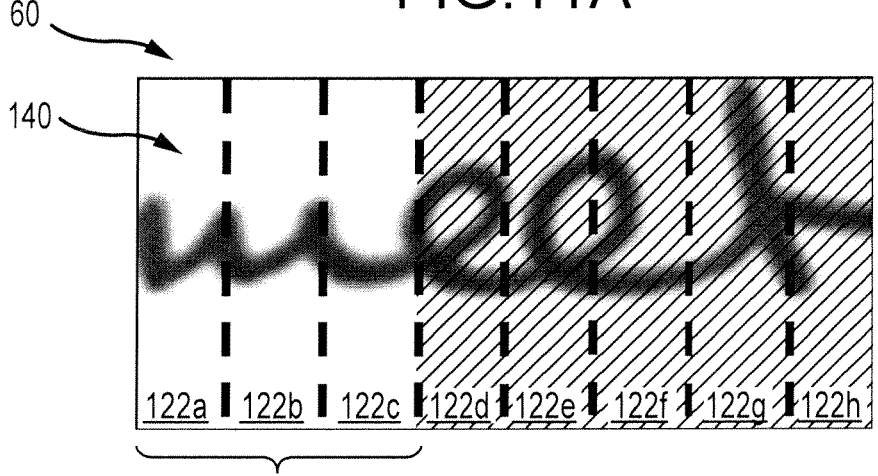
FIG. 11B is a pictorial representation of an embodiment of a 3-wide odd filter across a word block, in accordance with embodiments of the present disclosure.
Figure 11C:
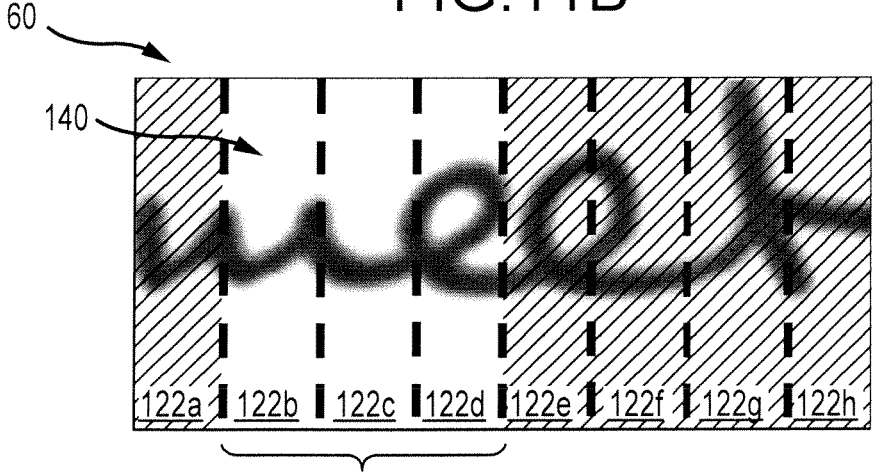
FIG. 11C is a pictorial representation of an embodiment of a 3-wide odd filter across a word block, in accordance with embodiments of the present disclosure.
Figure 11D:
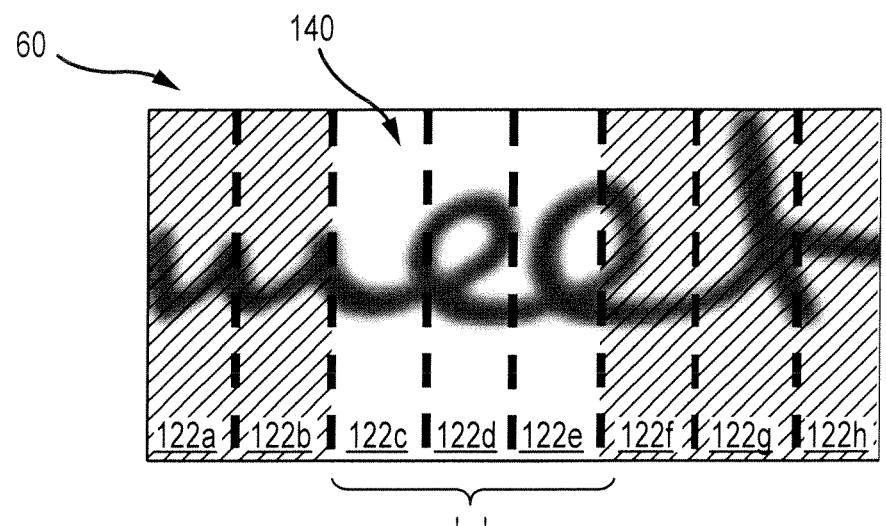
FIG. 11D is a pictorial representation of an embodiment of a 3-wide odd filter across a word block, in accordance with embodiments of the present disclosure.
Figure 11E:
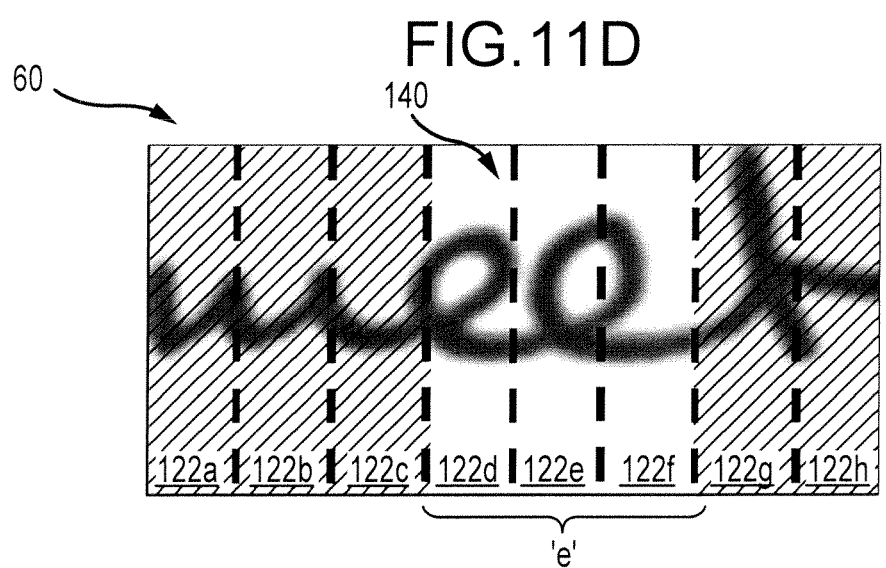
FIG. 11E is a pictorial representation of an embodiment of a 3-wide odd filter across a word block, in accordance with embodiments of the present disclosure.
Figure 11F:
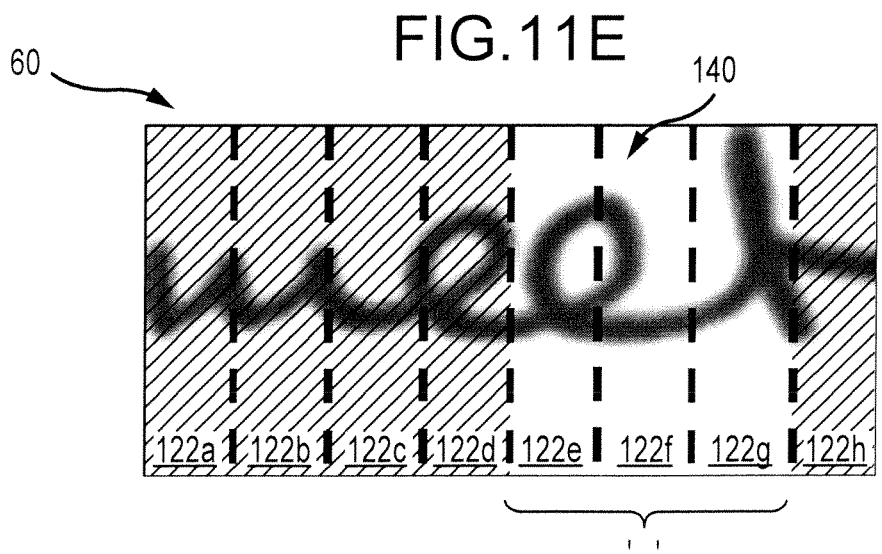
FIG. 11F is a pictorial representation of an embodiment of a 3-wide odd filter across a word block, in accordance with embodiments of the present disclosure.
Figure 11G:
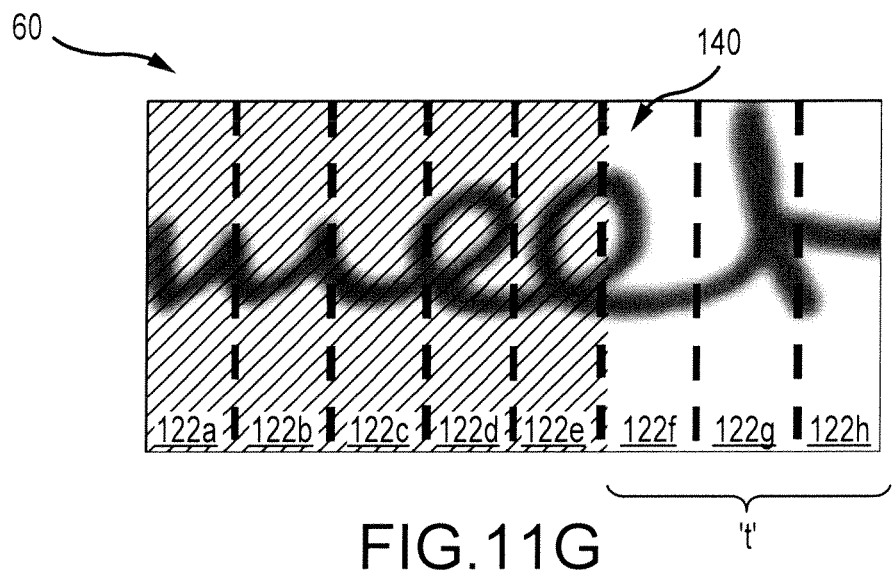
FIG. 11G is a pictorial representation of an embodiment of a 3-wide odd filter across a word block, in accordance with embodiments of the present disclosure.
Figure 11H:
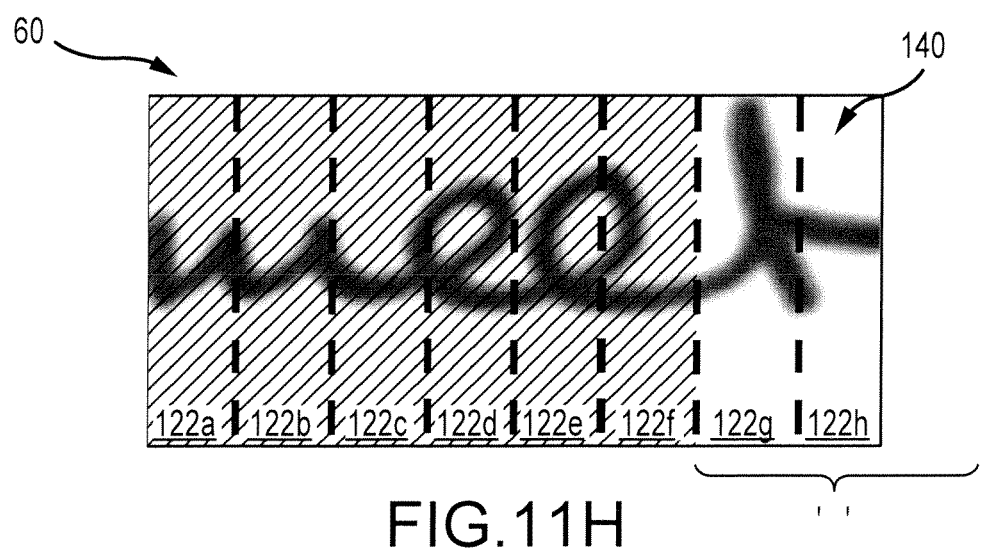
FIG. 11H is a pictorial representation of an embodiment of a 3-wide odd filter across a word block, in accordance with embodiments of the present disclosure.
Figure 12A:
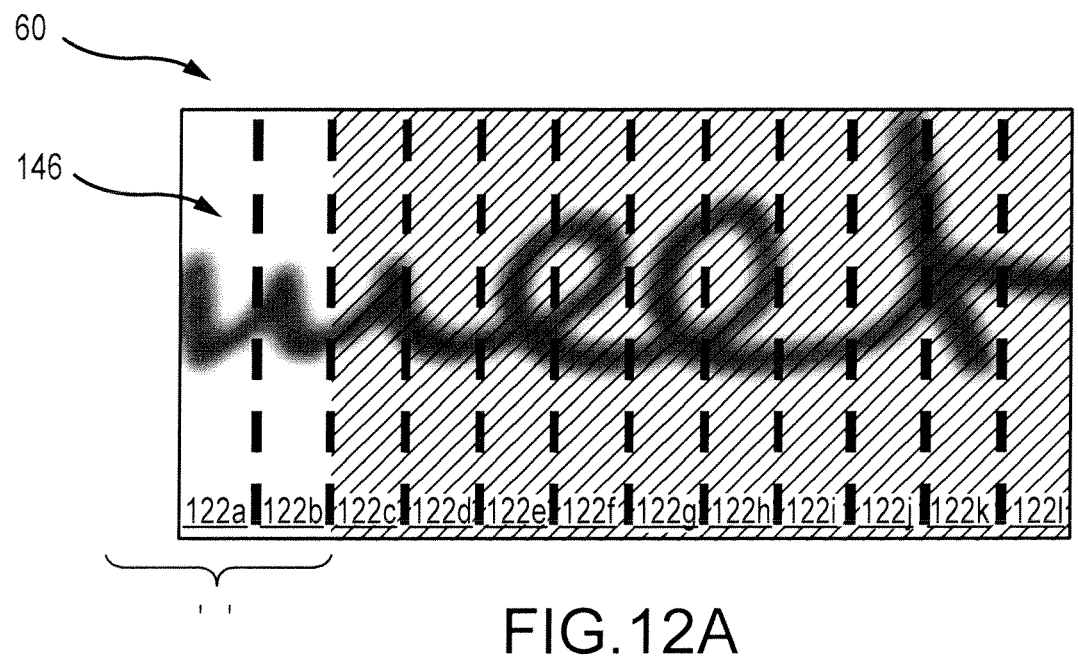
FIG. 12A is a pictorial representation of an embodiment of a 3-wide odd filter across a word block, in accordance with embodiments of the present disclosure.
Figure 12B:
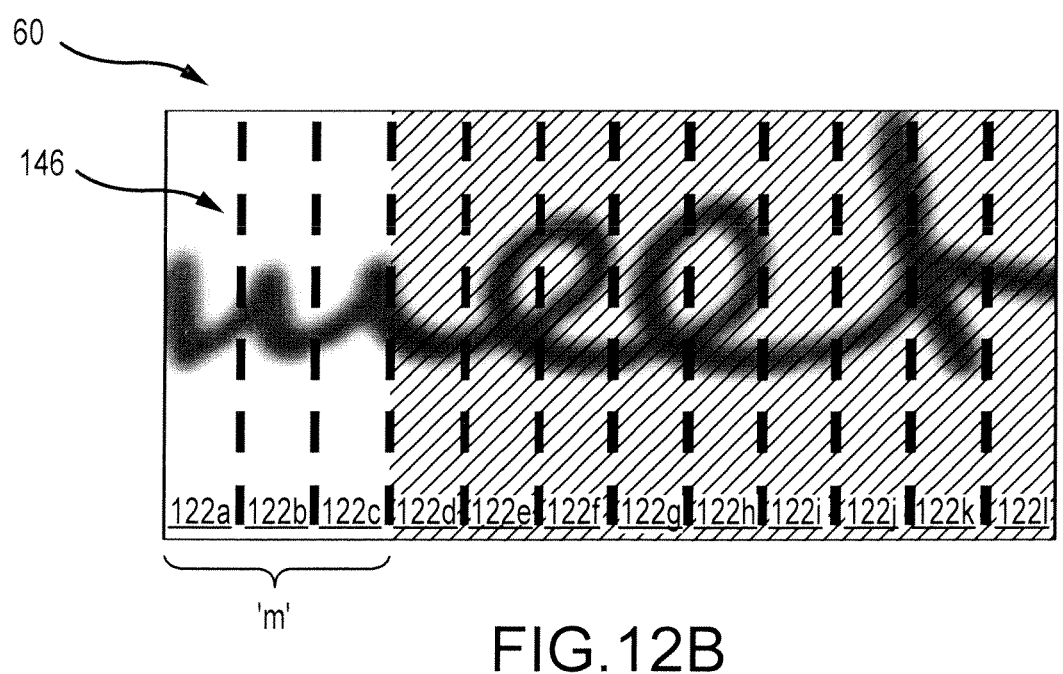
FIG. 12B is a pictorial representation of an embodiment of a 3-wide odd filter across a word block, in accordance with embodiments of the present disclosure.
Figure 12C:
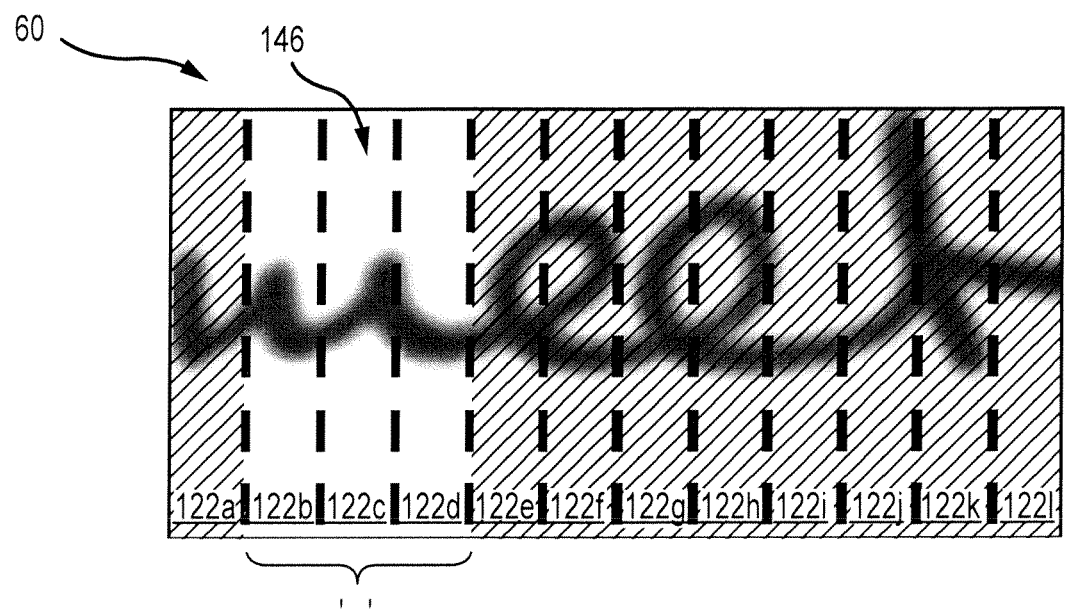
FIG. 12C is a pictorial representation of an embodiment of a 3-wide odd filter across a word block, in accordance with embodiments of the present disclosure.
Figure 12D:
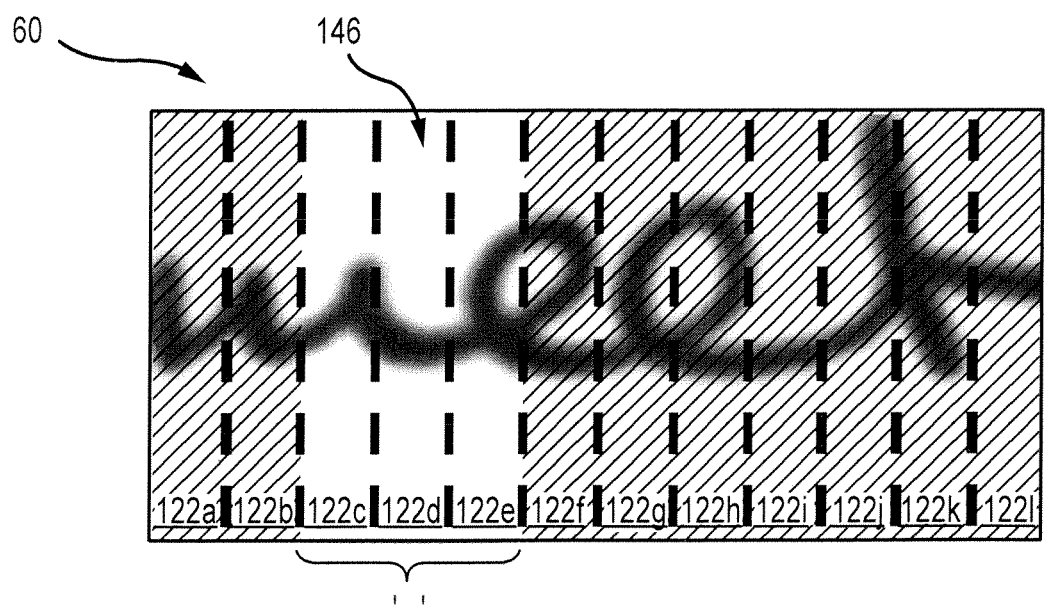
FIG. 12D is a pictorial representation of an embodiment of a 3-wide odd filter across a word block, in accordance with embodiments of the present disclosure.
Figure 12E:
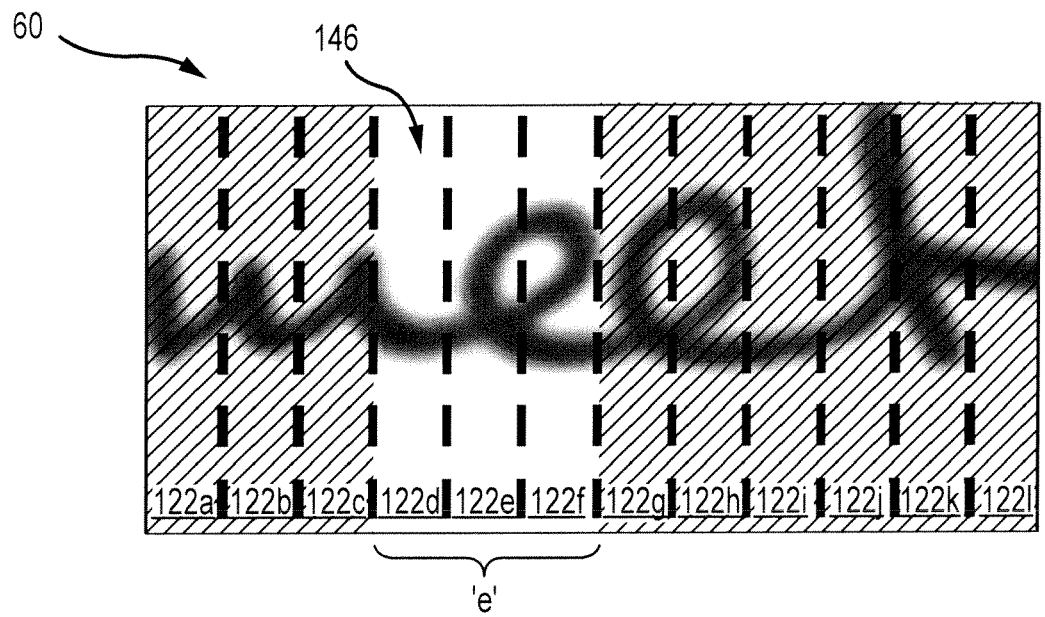
FIG. 12E is a pictorial representation of an embodiment of a 3-wide odd filter across a word block, in accordance with embodiments of the present disclosure.
Figure 12F:
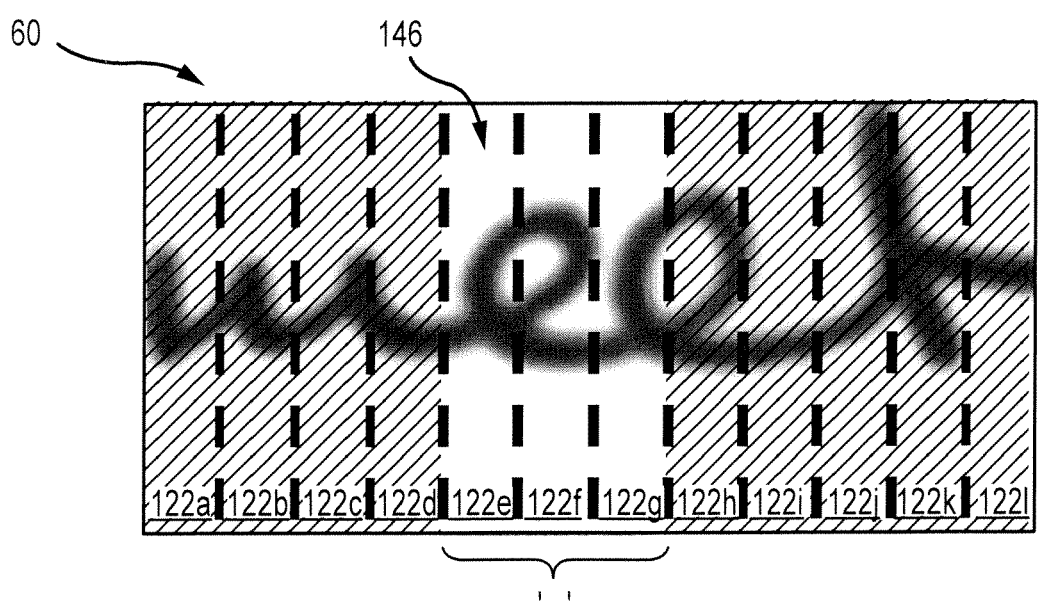
FIG. 12F is a pictorial representation of an embodiment of a 3-wide odd filter across a word block, in accordance with embodiments of the present disclosure.
Figure 12G:
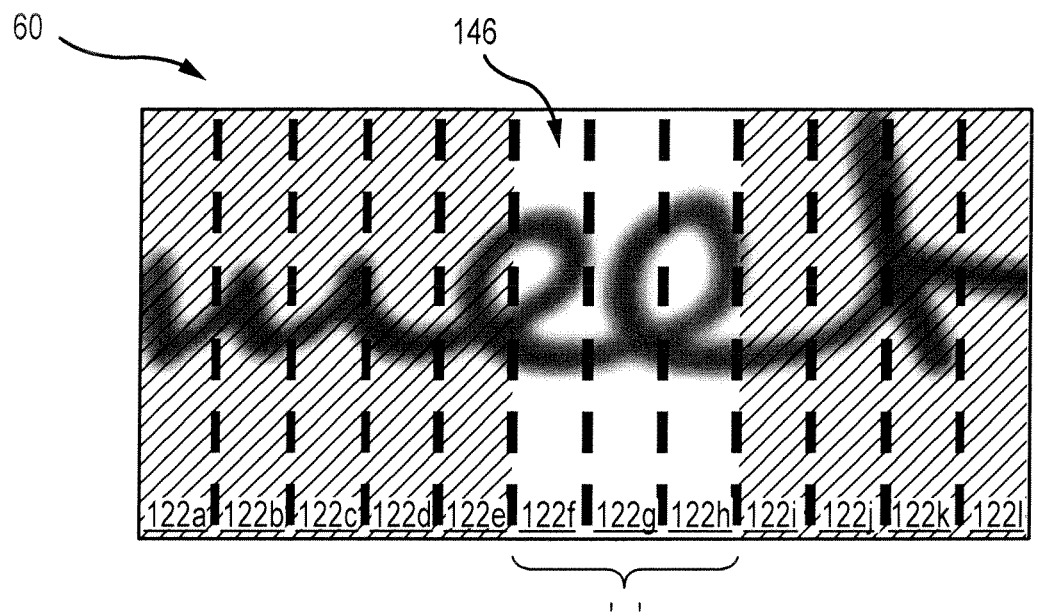
FIG. 12G is a pictorial representation of an embodiment of a 3-wide odd filter across a word block, in accordance with embodiments of the present disclosure.
Figure 12H:
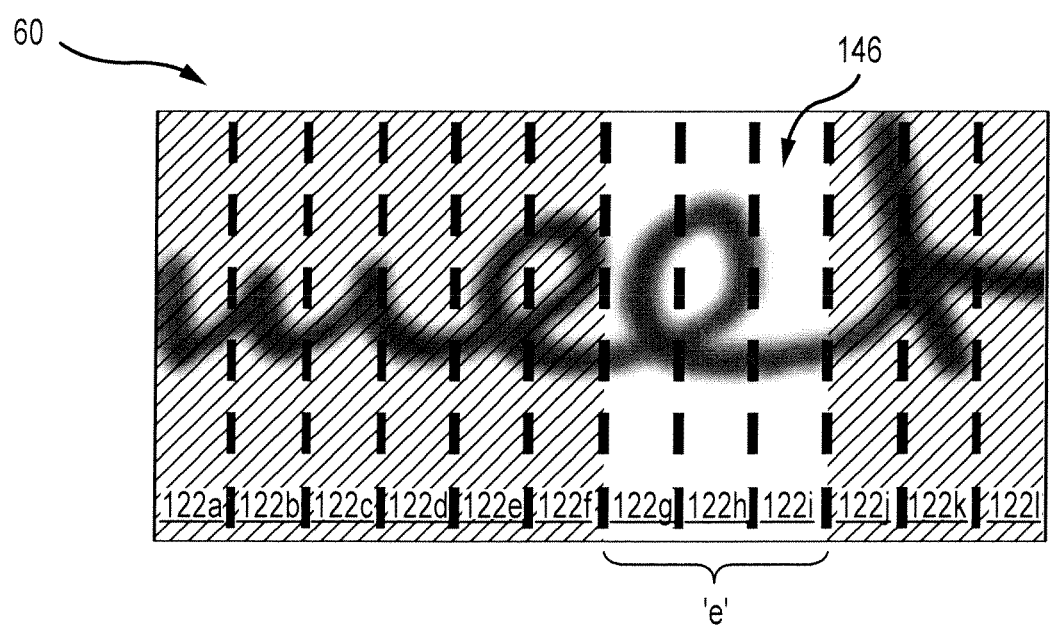
FIG. 12H is a pictorial representation of an embodiment of a 3-wide odd filter across a word block, in accordance with embodiments of the present disclosure.
Figure 12I:
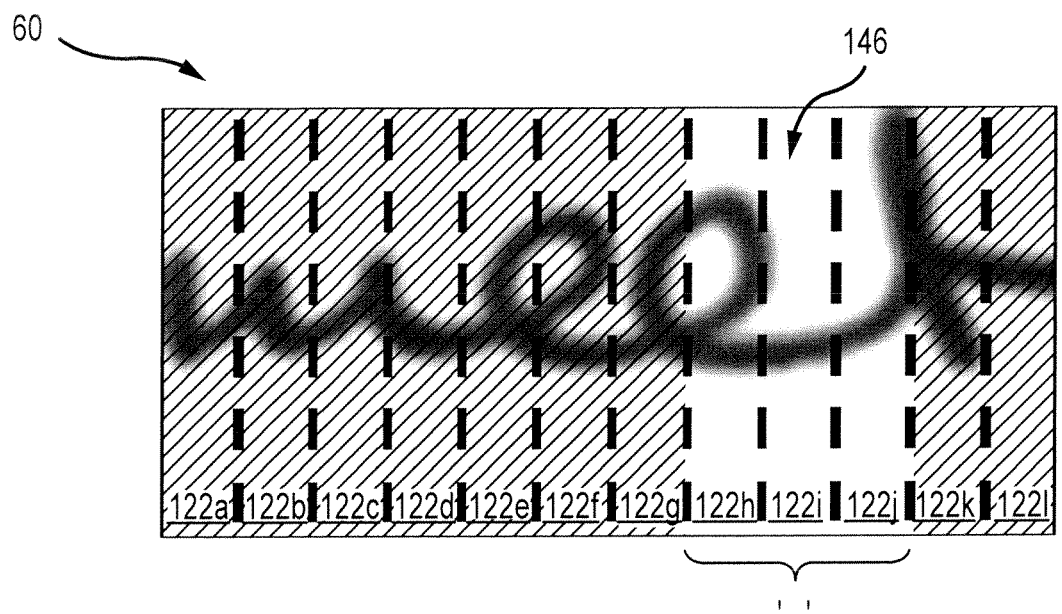
FIG. 12I is a pictorial representation of an embodiment of a 3-wide odd filter across a word block, in accordance with embodiments of the present disclosure.
Figure 12J:
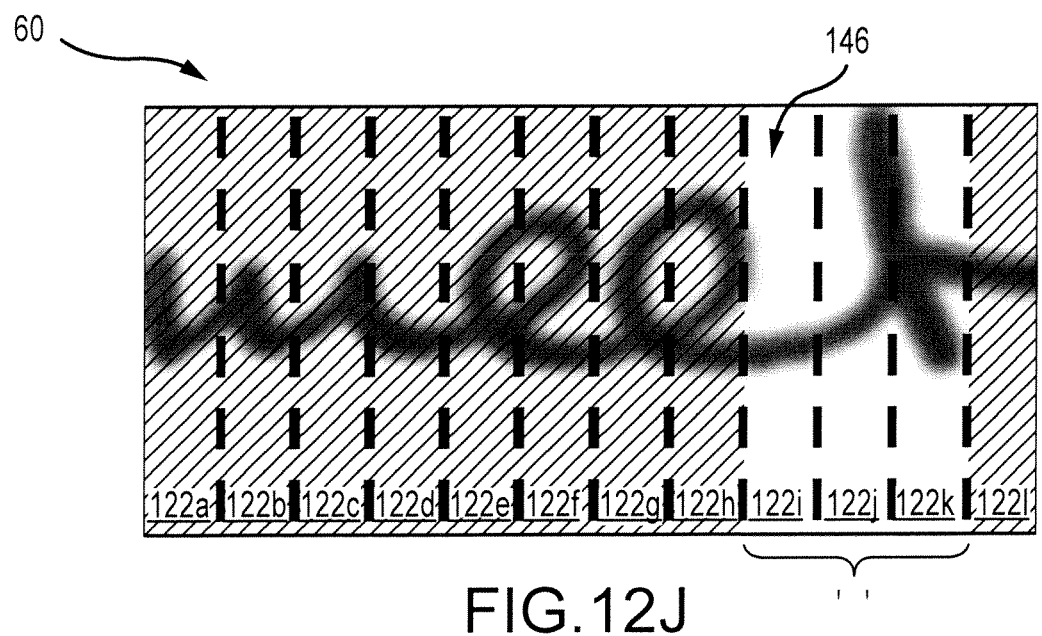
FIG. 12J is a pictorial representation of an embodiment of a 3-wide odd filter across a word block, in accordance with embodiments of the present disclosure.
Figure 12K:
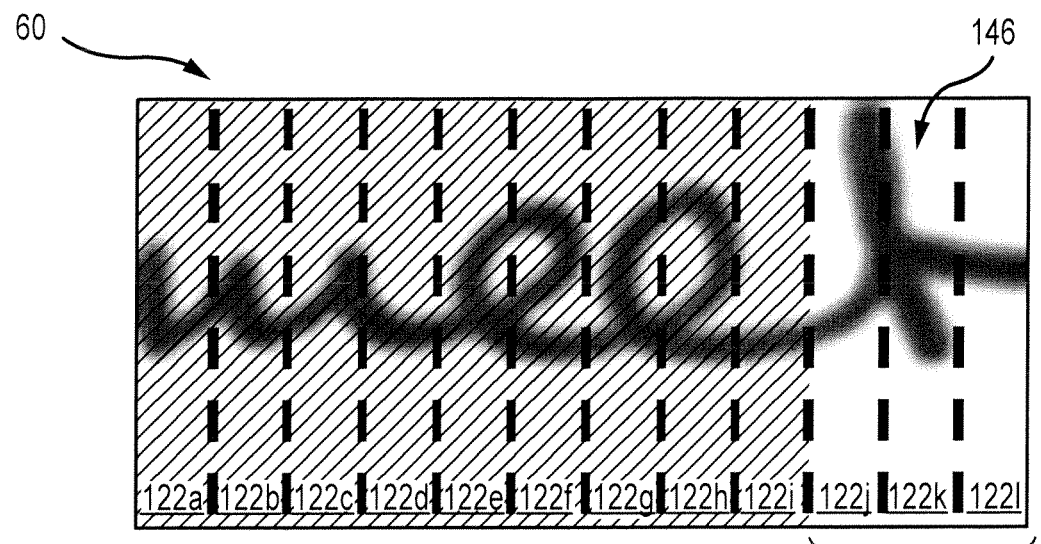
FIG. 12K is a pictorial representation of an embodiment of a 3-wide odd filter across a word block, in accordance with embodiments of the present disclosure.
Figure 12L:
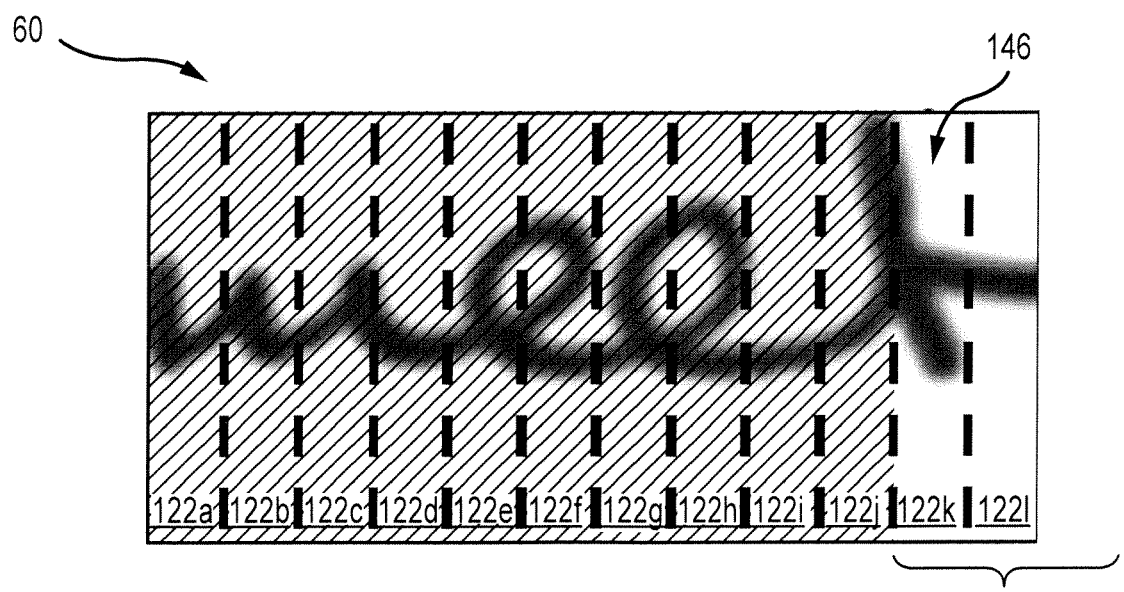
FIG. 12L is a pictorial representation of an embodiment of a 3-wide odd filter across a word block, in accordance with embodiments of the present disclosure.

FIGS. 11A-11H are pictorial representations of a receptive field of a 3-wide odd filter 140 on the 16N word block 60 illustrated in FIGS. 9A-9G and 10A-10G. In the illustrated embodiment, the filter 140 is not centered on a symbol. For example, as shown in FIG. 11A, the filter 140 is positioned over the regions 122*a* and 122*b* to return the letter "m". Additionally, as the filter 140 moves over with a stride of 1, FIG. 11B illustrates the filter 140 positioned over the regions 122*a*, 122*b*, and 122*c*. As shown, the regions within the filter 140 include the space between the "m" and the FIGS. 12A-L are pictorial representations of a receptive field of a 3-wide odd filter 146 on a 24N word block 60. In the illustrated embodiment, the filter 140 is centered over the symbols as the filter 140 steps across the word block 60, however, there are two blanks between each symbol. For example, as illustrated in FIG. 12A, the filter 140 is positioned over the regions 122*a* and 122*b*, thereby returning a blank. As the filter 140 steps over, with a stride of 1, the filter 140 is positioned over the regions 122*a*, 122*b*, and 122*c*, thereby returning the "m", as illustrated in FIG. 12B. Subsequently, as the filter 140 steps through the word block 60 with a stride of 1, each symbol will be evaluated by the CNN, thereby enabling the CNN to determine the characters forming the word block 60. In the illustrated embodiment, even tap filters center on each symbol as the fully convolution filter steps across the word, and odd filters either do not, or generate more than one blank between each symbol prediction. Despite that odd filters are much more common in the signal processing domain, even filters are used in the certain embodiments because 1) each of the 2N+1 evaluations are centered, on average, over a symbol or a blank, and 2) there is exactly one blank prediction between each symbol prediction. Even tap filters center on each symbol as the fully convolution filter steps across the word, and odd filters either do not, or generate more than one blank between each symbol prediction. Despite that odd filters are much more common in the signal processing domain, even filters may be used in embodiments because 1) each of the 2N+1 evaluations are centered, on average, over a symbol or a blank, and 2) there is exactly one blank prediction between each symbol prediction.

In certain embodiments, the string of symbols from the CNN can either be a word, a phone number, street address, or the like. In certain embodiments, the string of symbols represents a difficult, misspelled, or abbreviated word. Additionally, in certain embodiments, the string of symbols or characters forming the word block may be referred to as a "value" of the word block. For example, the word block 60 illustrated in FIGS. 8A-8D may have a value equal to "meet". In other words, the value is the predicted word or symbols forming the word block 60. As such, if a dictionary of a valid word block exists, a post processing operation using symbol probabilities and character error rate may be utilized to identify the symbols forming the word blocks 60. A pre-processing CNN can detect the type of text block, for example, utilizing a fourth CNN. For example, if it detects an address, word blocks corresponding to house numbers or zip codes can be passed into numeric dictionary classifiers. Similarly, pre-processing CNN can be modified to output a word block category of numeric, acronym, punctuation, etc., which may be utilized to constrain later processing of symbols, or even detect language or OCR vs. ICR and block v. script to direct later processing.

In certain embodiments, a normalized character error rate (CER) is represented by Equation (1).

$$CER = \frac{R + D + I}{R + D + I + C} \quad (1)$$

In Equation (1), R is the number of characters replaced, I is the number of characters inserted, D is the number of characters deleted, and C is the number of correct characters. In certain embodiments, CER may be utilized on a known-limited vocabulary matching system. To improve performance in applications that have a known-limited vocabulary, CER-based vocabulary matching systems may utilized dynamic programming along with Equation (2).

$$C_{i,j} = \min(C_{i-1,j} + 1, C_{i,j-1} + 1, \text{Diag}) \quad (2)$$

where:

$$\text{Diag} = \begin{cases} C_{i-1,j-1}, \\ C_{i-1,j-1} + 1 \end{cases}$$

For example, the CER between the output of the CNN and every word in the vocabulary may be computed. The word with the lowest CER can be chosen as the prediction. However, such an approach may disregard the information computed from the CNN, and as a result, character probabilities may be utilized to improve predictive modeling. In certain embodiments, this is referred to as "probabilistic CER" and uses character probabilities instead of simply the top character prediction. For example, for each character replaced, the error is equal to one minus the probability of the replacing character. For a character deleted, the error is equal to one minus the probability of a blank. For a character inserted, the error is equal to one minus the probability of the inserted character. Furthermore, in certain embodiments, there is weighted penalization for insertions and deletions, as opposed for replacements. For example, insertions and deletions may be penalized more than replacements. The word with the smallest CER error is then picked as the prediction. Furthermore, along with the CER, the method may also report the Word Error Rate (WER). In certain embodiments, the WER determines the average word-level accuracy of a system.

FIGS. 13A-13D are pictorial views of an embodiment of the CER calculation based on Equation (1). In the illustrated embodiment, the CER error is predicted between the word "tymme" and the word "time" using dynamic programming and Equation (2). FIGS. 13(*a*)-13(*d*) illustrate after one step of the calculation, after finishing "t", after finishing the first "m", and the final indication of a CER of 2, respectively.

Figure 14:
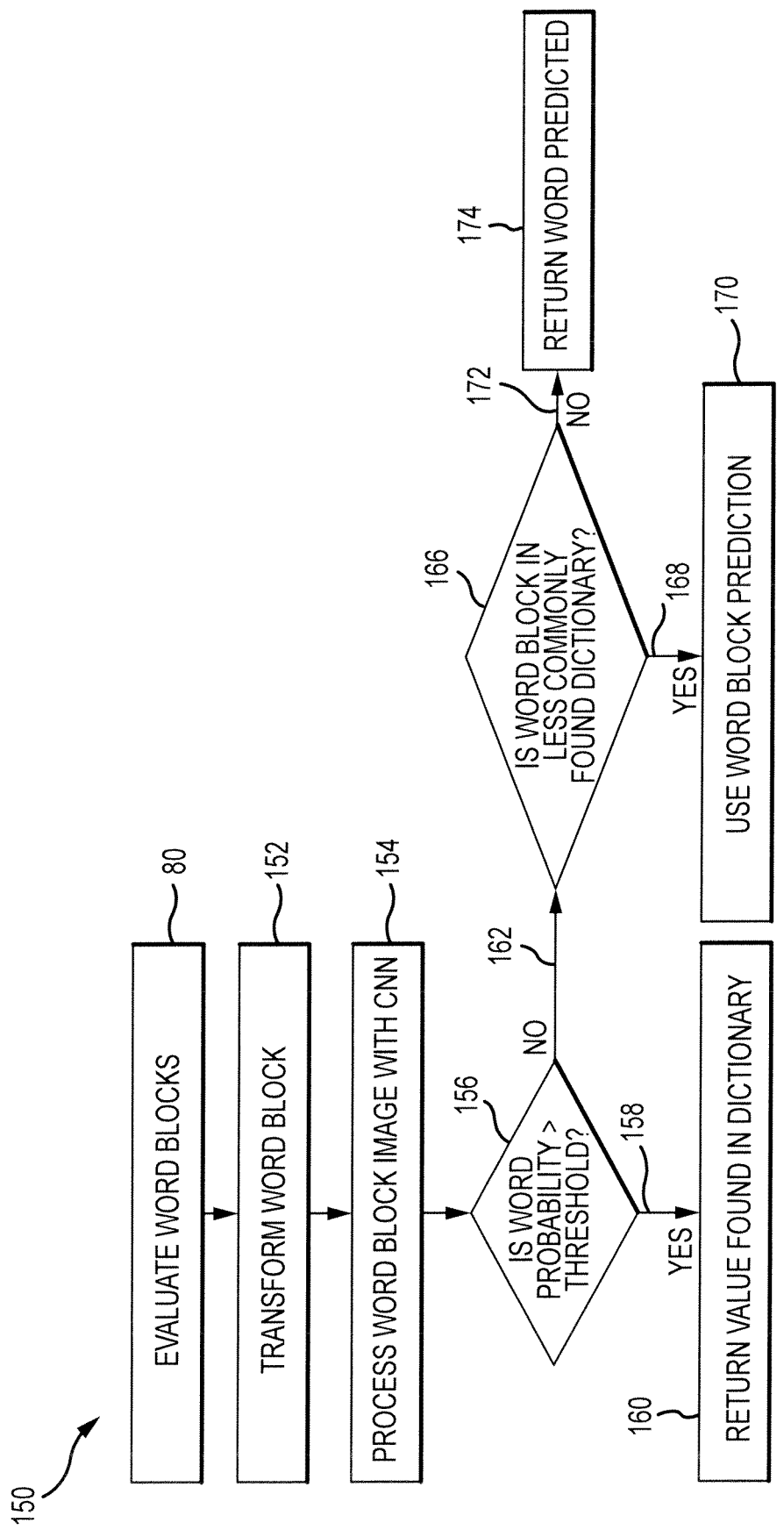
FIG. 14 is a flow chart of an embodiment of a method for returning a predicted word, in accordance with embodiments of the present disclosure.

FIG. 14 is a flow chart of an embodiment of a method 150 for returning a predicted word utilizing CNN and CER. In certain embodiments, the method 80 for evaluating word blocks 60 may be performed prior to performing the method 150. Specifically, the method 150 may be performed after block 94 of FIG. 5. Thereafter, the word block 60 is transformed (block 152). For example, the word block 60 may be transformed to a canonical form, for example, based off of a length prediction. As a result, the word block 60 will be transformed to a standard height and width based off a number of symbols predicted. Next, the word block 60 is processed through the CNN (block 154). In certain embodiments, as described above, a single CNN may be utilized to perform multiple steps of the evaluation of the word block 60. Thereafter, the word probability is evaluated against a threshold t for example using cross validation (operator 156). The word probability may be determined based on the input learning data sets or statistical analysis of a language. For example, in certain embodiments, the word "the" is utilized more often than the word "encyclopedia" in ordinary language. As a result, it may be more statistically probable that the word "the" is present in a sample of written text than "encyclopedia." Accordingly, the probabilities may vary based on statistical analysis of one or more languages. Furthermore, the probability may also be generated based on the type of document being processed. For example, tax returns may have a higher probability of numbers than a grocery list. If the word probability is greater than the threshold (line 158), the value found in the dictionary is returned (block 160). However, if the word probability is less than the threshold (line 162), the word block 60 is evaluated to determine if it is less commonly found in a dictionary (operator 166). If it is (line 168), word block prediction is used (block 170). If it is not (line 172), the predicted word is returned (block 174). In this manner, CER and CNN may be utilized together to predict words from handwritten documents. Furthermore, utilizing embodiments of the method described in FIG. 14 enable obvious, easier to predict words to be returned quickly and efficiently. For example, as described above, if a word is readily and confidently identified as being in a common dictionary, the value in the dictionary can be returned. However, as illustrated in the embodiment described in FIG. 14, if the word is not readily identified in the dictionary CNN, a second CNN (which may be the same CNN as the first CNN, in certain embodiments), may be utilized. In certain embodiments, the second CNN may utilize greater processing resources, since the word block 60 is a less common word. As will be described below, in certain embodiments, if the word block 60 cannot be identified utilizing the dictionaries, symbol recognition may be used. In other words, the word block 60 may be evaluated to predict the word or symbols forming the word block 60.

Figure 15:
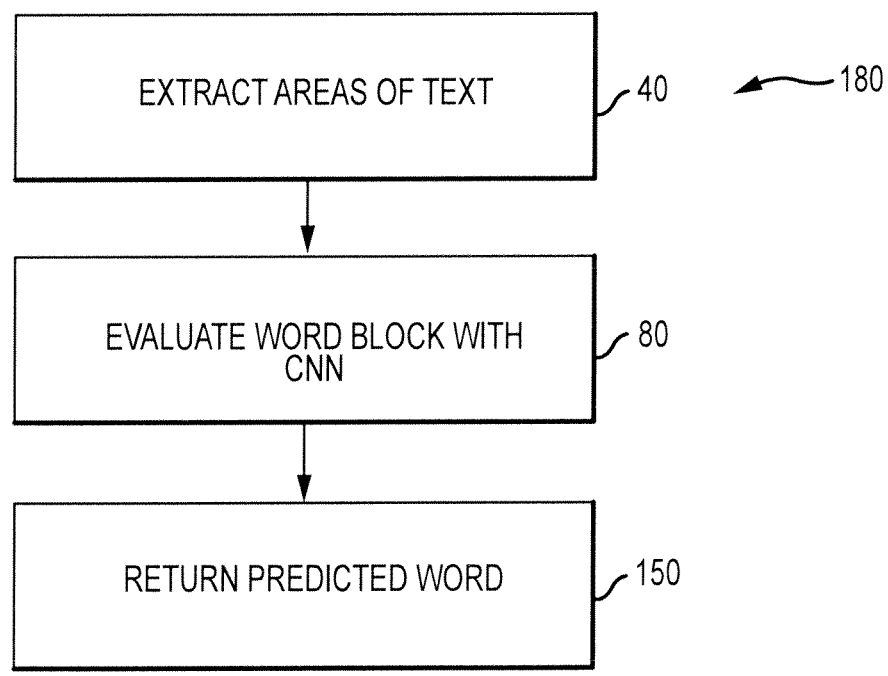
FIG. 15 is a flow chart of an embodiment of a method for identifying handwritten characters, in accordance with embodiments of the present disclosure.

FIG. 15 is a block diagram of a method 180 to identify handwritten characters using a CNN. As described in detail above, methods for extracting text, evaluating the text, and predicting words may be utilized to return a word (e.g., a predicted word or a value found in a dictionary). For example, the method 40 may be performed and followed by the method 80, as illustrated in FIGS. 13A-D. As a result, the word block 60 may be extracted from a block of text and subsequently evaluated via a CNN, such as a dictionary CNN. Thereafter, the method 150 may be utilized to evaluate the extracted text and determine whether to return a predicted word or a value found in a dictionary, such as a dictionary CNN. In this manner, blocks of handwritten text may be evaluated.

Figure 16:
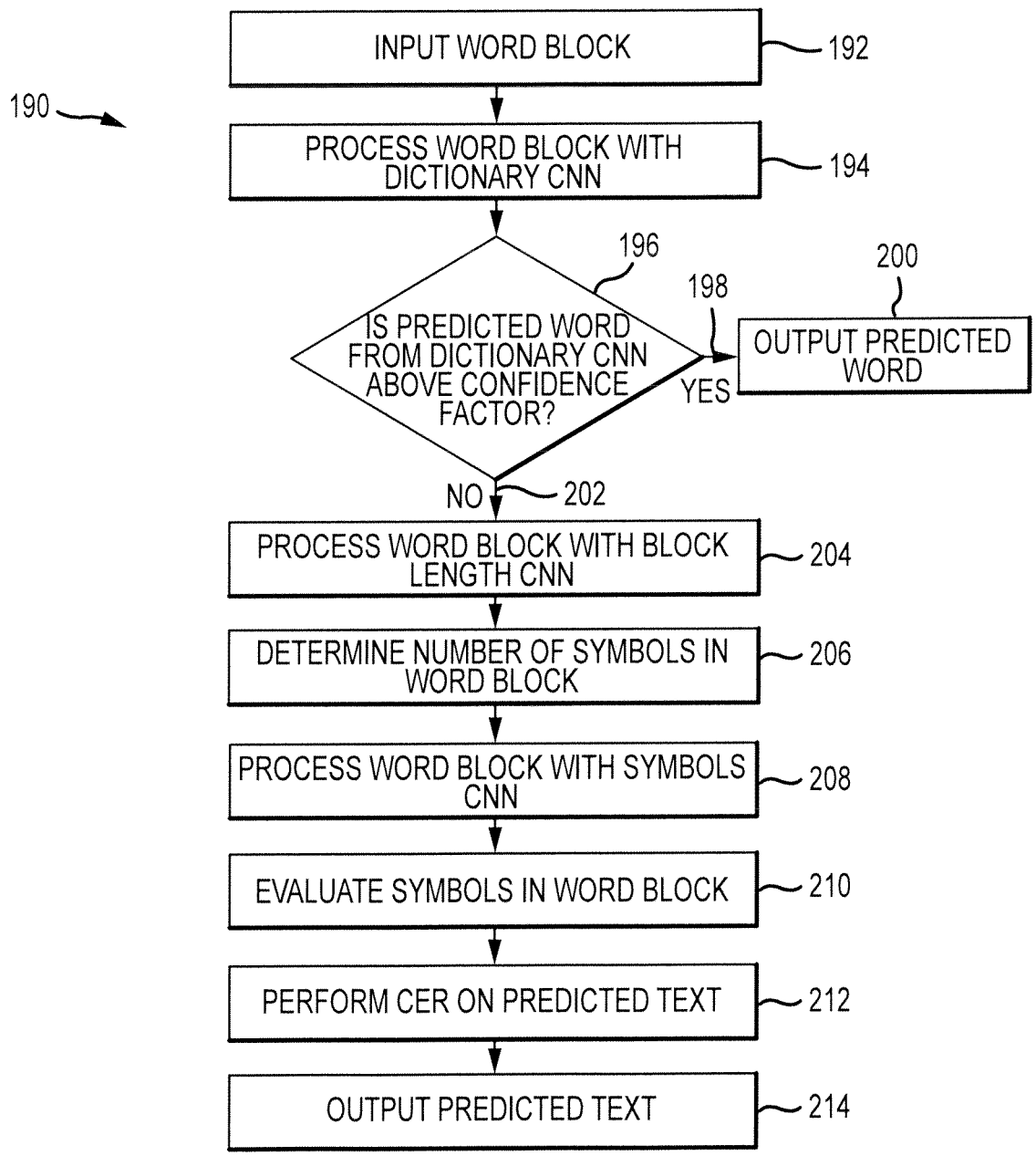
FIG. 16 is a flow chart of an embodiment of a method for identifying handwritten characters using one or more convolutional neural networks, in accordance with embodiments of the present disclosure.

FIG. 16 is a block diagram of a method 190 for analyzing hand written text utilizing one or more CNNs. First, the word block 60 is inputted to a CNN (block 192). For example, the word block 60 may be processed and sized into an input image such that the CNN can perform one or more convolutional, non-linearization, and/or pooling steps on the input image. Next, the input image may be analyzed with a dictionary CNN to determine if the input image is readily identifiable as a commonly used word (block 194). For example, the CNN may process the input image and compare the input image to words in a dictionary database. Thereafter, the predicted word may be evaluated against a threshold or confidence factor (operator 196). If the predicted word is above the threshold or confidence factor (line 198), the predicted word is output and the process ends (block 200). However, if the predicted word is below the threshold or confidence factor, or cannot otherwise be confidently determined (line 202), then the input image is reprocessed in the CNN to determine the number of symbols in the CNN (block 204). Next, the CNN (e.g., a block length or symbol CNN) is utilized to determine the number of symbols in the word block 60 (block 206). Thereafter, the output from the second CNN is evaluated by the CNN (e.g., a third CNN or a prediction Symbols CNN) to evaluate the individual symbols in the word block 60 for prediction (block 208). The third CNN evaluates the symbols in the word block 60 (block 210). For example, as described in detail above with reference to FIG. 7, the third CNN may split the input and perform filtering with zero padding to analyze the symbols. Then, CER is performed to evaluate the predicted text (block 212). For example Equations (1) and (2) may be utilized to perform CER. Thereafter, the predicted text may be output (block 214). In this manner, handwritten text (e.g., words, symbols, numbers, etc.) may be analyzed and predicted. It should be understood that in certain embodiments the word prediction may be referred to as a "value" of the word or a "value" of the symbols forming the word block. Moreover, as described above, it should be appreciated that, in certain embodiments, a single CNN architecture may be utilized to perform each step. That is, reference to a "first CNN" or "second CNN" or "third CNN" should not be interpreted to mean different architectures or code structures. In fact, the CNN may be reused for several iterations to obtain desirable results.

As described in detail above, embodiments of the present disclosure can be utilized to analyze and predict words, symbols, numbers, or the like from digitized images, such as handwritten images, photos, videos, online content, or the like. For example, in certain embodiments Caffe may be utilized to analyze the method. In certain embodiments, computer programming, such as Python or the like, may be utilized to handle labels and the left/right shift operation of the top/bottom streams described in detail in FIG. 7. In certain embodiments, batch sizes of 64 may be run for approximately 50,000 iterations. Furthermore, embodiments of the present disclosure may utilize a learning rate of 0.001 to train the network with 0.9 momentum. Also, in certain embodiments, the learn rate may be decreased to 0.0001 after 40,000 iterations. Moreover, L2-regularization with X=0.0025 may be utilized. In certain embodiments, image datasets from CIFAR-10 may be used, with further refinement and fine-tuning on the NIST dataset.

Embodiments of the present disclosure were tested on IAM, RIMES, and NIST offline handwritten datasets. In the illustrated embodiment, the IAM dataset contains 115,320 English words, mostly cursive, by 500 authors. This dataset includes training, validation, and test splits, where an author contributing to a training set, cannot occur in the validation or test split. The RIMES dataset contains 60,000 French words, by over 1000 authors. There are several versions of the RIMES dataset, where each newer release is a super-set of prior releases. Embodiments of the present disclosure were tested on the ICDAR 2011 release. The NIST Handprinted Forms and Characters Database, Special Database 19, contains NIST's entire corpus of training materials for handprinted document and character recognition. Each author filled out one or more pages of the NIST Form-based Handprint Recognition System. It publishes Handprinted Sample Forms from 810,000 character images, by 3,600 authors.

Embodiments of the present disclosure were tested on the IAM English handwritten dataset. The embodiments achieves CER of 6.97% on IAM. Table 1 shows that embodiments of the present disclosure are quite competitive against different methods of this dataset. FIG. 18 is a pictorial representation of predictions obtained with the symbol sequence prediction model on the IAM dataset. The third example has a questionable ground truth and a prediction that could be considered valid out of context. To obtain a fair comparison with other methods embodiments of the present disclosure did not alter the ground truth in any way.

TABLE 1

Comparison of results of IAM dataset to different methods.

| | Database IAM Model | |
|---|---|---|
| | WER | CER |
| Dreuw et al. | 18.8 | 10.1 |
| Embodiments of the present disclosure | 12.34 | 6.97 |
| Boquera et al. | 15.5 | 6.90 |
| Kozielski et al. | 13.30 | 5.10 |
| Bluche et al. | 11.90 | 4.90 |
| Doetsch et al. | 12.20 | 4.70 |
| Poznanski and Wolf | 6.45 | 3.44 |

As illustrated in Table 1, Kozielski et al. used HMMs. Drewu et al. and Boquera et al. use a hybrid neural network and Hidden Markov Model (HMM) approach. Drewu et al. showed that Gaussian HMMs can be trained to outperform HMMs. Bluche et al. used Gaussian HMMs to initialize neural networks and showed that both deep CNNs and RNNs could produce state of the art results. Doetsch et al. uses a custom LSTM topology along with CTC alignment. Others used all words in a sentence and paragraph respectively to provide word context. Poznanski and Wolf used deep CNNs to extract n-gram attributes which feed CCA word recognition. Others use deslanting, training augmentation, and an ensemble of test samples. Embodiments of the present disclosure use a first dictionary CNN of 800 words. The symbol CNN uses 96 symbols, and also uses probabilistic CER correction. During testing of methods of the present disclosure, deslanting algorithms were not used, and no train or test sample augmentation was used. Aside from the probabilistic CER correction, no CTC alignment CCA post correction was applied. As illustrated in Table 1, while competitive results are not ranked the best, embodiments of the present disclosure include a processing path that can work at both the symbol (i.e., will work just as well on street address or phone number) and dictionary level, and embodiments of the present disclosure include substantially more symbols than prior methods. For example, these prior methods may not be able to recognize digits and only recognize upper and lower case Latin alphabet.

TABLE 2

List of experiments on IAM in order

| | Database IAM Additional Models | |
|---|---|---|
| | WER | CER |
| Wide filter | 45.34 | 16.39 |
| Voc. 800 | 29.82 | 12.30 |
| Prob. > 0.9 | 31.85 | 11.97 |
| Improved length prediction | 27.15 | 10.09 |
| +1 layer misaligned filters | 25.92 | 9.74 |
| CER Fixed prediction | 14.32 | 8.08 |
| Prob. CER Fixed | 12.78 | 7.25 |
| Word Count | 12.34 | 6.97 |

Several studies were performed on the IAM dataset to understand the performance of embodiments of the present disclosure. The first experiment used two convolution layers as the prediction portion of the model, the first layer had 256 4×8 filters, the second layer was a 1×1 filter that obtained the character prediction. No pre-processing or post processing was applied besides a simple length prediction using a CNN was 0.39. For the length prediction the first layers are described in FIGS. 4A, 4B, 6A, and 6B. For the length prediction a 4×4 CNN filter+Dropout followed by a Full-Connected layer with 1 output was used.

Further experiments were performed on embodiments of the present disclosure. For example, an experiment introduced the vocabulary classifier where the top 800 words were classified along with the length of a word prior to the ICR. If the prediction was within the top 800 most frequent words that prediction is the final prediction. Otherwise the prediction from the symbol sequence prediction model was used. To improve performance the word classifier was only used if the prediction probability was over 0.9.

In certain experiments of the present disclosure, it was noticed that improvements to the system regarding situations when the length of the word didn't match with the length prediction. The length prediction model was replaced with the ones described in FIGS. 6A and 6B. This reduced the average length error to 0.12 and lowered the normalized CER to 10.09 (Model: Improved length prediction). Next, the symbol sequence prediction model was replaced with the one described in FIG. 7. This improved performance when a particular character does not perfectly or substantially perfectly align with the even filter model. With the new architecture the CER was reduced to 9.74%. Since the IAM dataset has a fixed vocabulary it is possible to use the vocabulary to find a closest match to a prediction before the final word prediction. Doing so based on the CER from prediction to all other words improved performance to 8.08% error. The probabilistic based CER vocabulary matching improved performance even further down to 7.25% error. Since the probabilistic CER offers a way to translate character prediction sequences into a word probability it is also possible (and desired in certain embodiments) to combine probabilities from other sources. To demonstrate this, embodiments of the present disclosure combine the Probability CER method with a simple word frequency based probability (Equation 3) where N is the number of occurrences of the word). This brought the CER down to 6.97%.

$$Prob.\ CER = P(I) + P(D) + P(R) + \frac{1}{1+N} \quad (3)$$

Additionally, embodiments of the present disclosure were further tested on the RIMES dataset. The symbol dictionary was increased to 111 as the RIMES dataset adds 15 new French symbols. The model obtained a 3.54% CER which is among the state of the art on the RIMES challenge. Table 3 shows the performance of embodiments of the present disclosure against other methods.

TABLE 3

Comparison of results on RIMES dataset to previous methods.

| | Database RIMES Model | |
|---|---|---|
| | WER | CER |
| Kozielski et al. | 13.70 | 4.60 |
| Doetsch et al. | 12.90 | 4.30 |
| Bluche et al. | 11.80 | 3.70 |
| Embodiments of the present disclosure | 7.51 | 3.49 |
| Poznanski and Wolf | 3.90 | 1.90 |

FIG. 19 is a pictorial representation of examples of predictions obtained on the RIMES dataset using the symbol sequence prediction. In embodiments, the vocabulary independent symbol CNN model reads characters literally. In general, errors can be attributed to character ambiguity, segmentation artifacts (Sample "effet" contains a comma even though it isn't part of the label), or character overlap (Sample "vous"). The last three rows of FIG. 19 contain examples of good, or successful, predictions. For these examples the sequence predictions obtained perfect or near-perfect predictions. The sequence prediction alone obtains 46.77% WER without post processing.

While there are several class specific handwritten datasets, both at the character and word level, there is no large handwritten dataset that concentrates on word blocks of arbitrary symbols. Further, no other method can perform well on both dictionary and symbol based datasets. To test the performance of embodiments of the present disclosure on generic word blocks made of arbitrary symbols, a new symbol recognition dataset was created by stochastically combining the NIST individual character images into realistic word blocks. Images of hand printed text are simulated by extracting character images from a single randomly selected writer in the NIST dataset and concatenating them into word blocks of random dictionary words, random strings of alphanumeric characters, or random strings of numeric characters. In addition, the NIST dataset has been supplemented with handwritten punctuation, mathematical symbols, and other common special characters such as the dollar sign and the ampersand to facilitate in generating word block images of common form-field inputs such as dollar amounts, phone numbers, and email addresses.

The images are further augmented by adding random amounts of displacement, stretching, and rotation to each symbol to simulate the natural variability in a writer's penmanship. A random amount of skew is then applied to each concatenated image to vary the slant of the word block. Finally, random amounts of noise and blur are added to simulate the effects of image digitization. FIG. 17 shows a random extraction of nine word blocks from this new dataset. A subset of 2951 samples was created, split into 954 four digit numbers, 1000 ten digit numbers and 997 English words (with punctuation). Embodiments of the present disclosure get 70.6% accuracy on the 997 English words.

Embodiments of the present disclosure introduce an offline handwriting recognition algorithm using a fully convolutional network. Unlike dictionary based methods, the presently described methods can recognize common words as well as infinite symbol blocks such as surnames, phone numbers, and acronyms. The pairing of word block length prediction along with a family of even convolution filters enable accurate symbol alignment. Wide receptive field filters with left, center, and right shifting eliminate complex character alignment methods such as CTC in recurrent based methods. The disclosed FCNN method utilizes a large symbol set to recognize both common words as well as virtually any symbol block and achieves state-of-the-art results on the English-based IAM and French-based RIMES dictionary datasets, as well as the NIST arbitrary symbol handwritten dataset.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A computer-implemented method, comprising:
   obtaining a word block input, the word block input including at least one symbol;
   processing the word block against a first dictionary, the first dictionary containing a collection of most common words;
   comparing the word block against a word in the first dictionary, the comparison providing a confidence factor that the word block corresponds to the word;
   outputting a prediction equal to the word when the confidence factor is greater than a predetermined threshold;
   evaluating properties of the word block when the confidence factor is less than the predetermined threshold, the properties being at least one of the length of the word block and the number of symbols in the word block;
   resizing the word block based upon the determined length of the word block or the number of symbols in the word block, the resizing corresponding to at least one of a height or a width of the word block, the resizing enabling the word block to be evaluated by a fully convolutional neural network without adjusting parameters of the fully convolutional neural network;
   predicting a value of the resized word block based on the properties of the resized word block, wherein predicting a value of the resized word block is performed using a neural network, the neural network including a hierarchy of receptive fields to make a prediction associated with values of the symbols in the resized word block, wherein the neural network is a fully convolutional neural network and the hierarchy of receptive fields include a plurality of portions of the symbols before or after each symbol;

determining an error rate for the predicted value of the resized word block, the error rate corresponding to a calculated difference between the predicated word and one or more words from the first dictionary; and outputting a value for the resized word block, the output equal to a calculated value corresponding to a value of the resized word block having the lowest error rate when the confidence factor is less than the predetermined threshold.

2. The computer-implemented method of claim 1, further comprising:

receiving a digital image, the digital image including the at least one symbol;

extracting areas of text from the digital image;

splitting the areas of text into lines of text;

splitting the lines of text into the one or more word blocks, the one or more word blocks including the at least one symbol.

3. The computer-implemented method of claim 1, wherein resizing the word block comprises resizing the word block to canonical width using at least one of blank prediction or length prediction to thereby resize a width of each symbol forming the word block to be equal.

4. The computer-implemented method of claim 1, wherein determining the error rate comprises calculating a probabilistic character error rate comprising:

symbol probabilities associated with the symbols forming the resized word block;

word probabilities from the first dictionary; and contextual probabilities associated with one or more different word blocks associated with the resized word block.

5. The computer-implemented method of claim 1, wherein determining the error rate comprises calculating a probabilistic character error rate comprising:

assigning word probabilities to the resized word block, a value of the resized word block determined by evaluating the at least one symbol forming the resized word block with a fully convolutional neural network; and matching the resized word block against a word from the first dictionary, the matching including inserting, deleting, or substituting symbols in the word block to correspond to the word from the first dictionary.

6. The computer-implemented method of claim 5, wherein the probabilistic error rate penalizes symbol insertion and deletion more than symbol replacement.

7. The computer-implemented method of claim 5, further comprising classifying the resized word block prior to predicting a value of the resized word block, the classification associated with a property of the resized word block.

8. The computer-implemented method of claim 7, wherein the property of the resized word block is a class of characterization, a font, a language, a script, or a combination thereof.

9. The computer-implemented method of claim 1, further comprising evaluating a second dictionary data comprising a list of second dictionary words, the evaluation comparing the prediction equal to the word against a second dictionary word and outputting the second dictionary word when the prediction equal to the word corresponds to the second dictionary word.

* * * * *